(12) United States Patent
Li et al.

(10) Patent No.: US 10,819,634 B2
(45) Date of Patent: *Oct. 27, 2020

(54) PACKET EDIT PROCESSING METHOD AND RELATED DEVICE

(71) Applicant: Huawei Technologies Co., Ltd., Shenzhen (CN)

(72) Inventors: Nan Li, Beijing (CN); Linchun Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

This patent is subject to a terminal disclaimer.

(21) Appl. No.: 16/217,293

(22) Filed: Dec. 12, 2018

(65) Prior Publication Data

US 2019/0116120 A1 Apr. 18, 2019

Related U.S. Application Data

(63) Continuation of application No. 15/365,606, filed on Nov. 30, 2016, now Pat. No. 10,171,356, which is a (Continued)

(51) Int. Cl.
*H04L 12/741* (2013.01)
*H04L 12/46* (2006.01)
*H04L 29/06* (2006.01)

(52) U.S. Cl.
CPC .......... *H04L 45/74* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 5,490,252 A * 2/1996 Macera ............... H04L 12/5692
370/402
6,266,700 B1 * 7/2001 Baker ..................... H04L 29/06
370/401
(Continued)

FOREIGN PATENT DOCUMENTS

CN 1949736 A 4/2007
CN 101335648 A 12/2008
(Continued)

OTHER PUBLICATIONS

Guofeng, Chen, "The Research and Application on Intranet IPv6 transition technology", Hangzhou Dianzi University, Dec. 2011, 92 pages.

*Primary Examiner* — Bunjob Jaroenchonwanit
(74) *Attorney, Agent, or Firm* — Slater Matsil, LLP

(57) ABSTRACT

A method, including obtaining a first protocol descriptor according to a protocol header field of an input packet, and further according to a preset protocol field mapping relationship, where the first protocol descriptor corresponds to the protocol header field of the input packet, and where the preset protocol field mapping relationship comprises a mapping relationship between the first protocol descriptor and the protocol field of the input packet, obtaining a second protocol descriptor according to the first protocol descriptor, obtaining, according to the preset protocol field mapping relationship and the second protocol descriptor, a second protocol header field, and obtaining an output packet, where the output packet comprises the second protocol header field.

26 Claims, 8 Drawing Sheets

Related U.S. Application Data continuation of application No. PCT/CN2014/078917, filed on May 30, 2014.

(52) U.S. Cl.
CPC ............. *H04L 69/06* (2013.01); *H04L 69/08* (2013.01); *H04L 69/18* (2013.01)

(56) References Cited

U.S. PATENT DOCUMENTS

| | | | |
|---|---|---|---|
| 6,502,236 B1 | 12/2002 | Allen et al. | |
| 6,651,102 B2 * | 11/2003 | Baker | H04L 29/06 370/401 |
| 6,879,682 B1 * | 4/2005 | Nguyen | H04Q 3/0029 370/466 |
| 7,093,288 B1 * | 8/2006 | Hydrie | H04L 63/0236 709/227 |
| 7,328,283 B2 | 2/2008 | Tan | H04L 29/06 370/392 |
| 8,705,533 B1 | 4/2014 | Venkatraman et al. | |
| 8,874,758 B2 * | 10/2014 | Cheng | H04L 12/66 709/227 |
| 9,444,915 B2 | 9/2016 | Wu | |
| 2001/0005369 A1 * | 6/2001 | Kloth | H04L 12/467 370/392 |
| 2003/0129981 A1 * | 7/2003 | Kim | H04W 36/14 455/436 |
| 2003/0172177 A1 | 9/2003 | Kersley et al. | |
| 2003/0177254 A1 * | 9/2003 | Baker | H04L 29/06 709/230 |
| 2005/0078704 A1 | 4/2005 | Anderson et al. | |
| 2006/0077895 A1 * | 4/2006 | Wright | H04L 29/12358 370/235 |
| 2006/0245358 A1 * | 11/2006 | Beverly | H04L 47/10 370/235 |
| 2008/0137598 A1 * | 6/2008 | Bouvier | H04L 65/1069 370/329 |
| 2009/0150286 A1 * | 6/2009 | Barton | G06Q 20/10 705/44 |
| 2010/0150169 A1 * | 6/2010 | Brown | H04L 67/2823 370/466 |
| 2010/0202456 A1 * | 8/2010 | Godor | H04L 12/66 370/392 |
| 2013/0198411 A1 * | 8/2013 | Yoon | H04L 69/321 709/244 |
| 2013/0283348 A1 * | 10/2013 | Garrett | H04L 12/2861 726/3 |
| 2015/0085878 A1 * | 3/2015 | Kangarlou | H04L 69/18 370/469 |
| 2015/0264404 A1 * | 9/2015 | Hannuksela | H04N 19/70 375/240.16 |
| 2015/0319271 A1 | 11/2015 | Wu | |
| 2017/0286358 A1 * | 10/2017 | Srivastava | G06F 13/4291 |

FOREIGN PATENT DOCUMENTS

| | | |
|---|---|---|
| CN | 103780481 A | 5/2014 |
| CN | 103873464 A | 6/2014 |

* cited by examiner

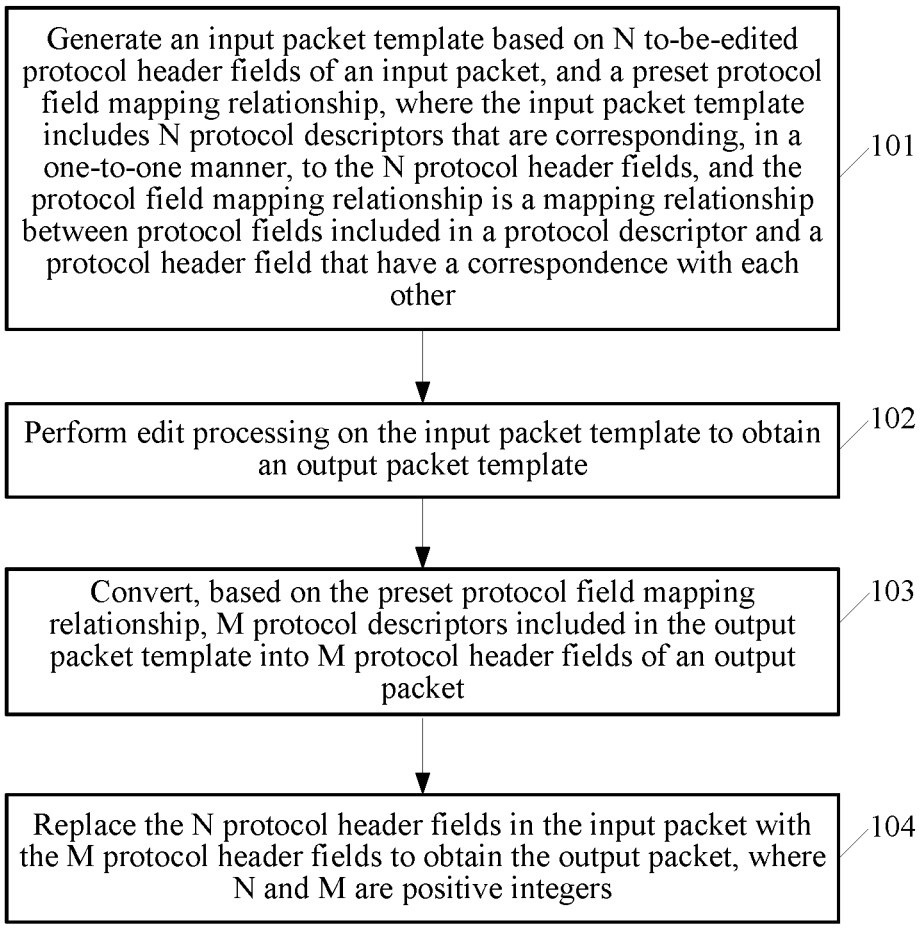
FIG. 1
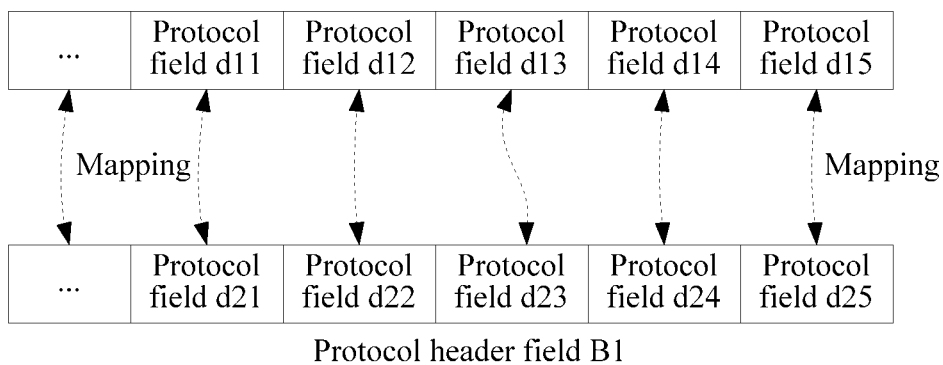
FIG. 2-a

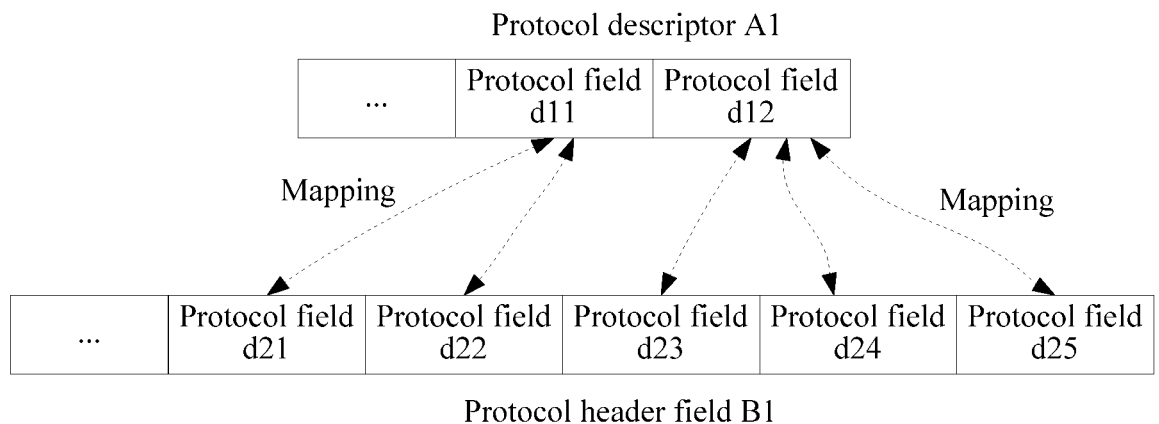
FIG. 2-b
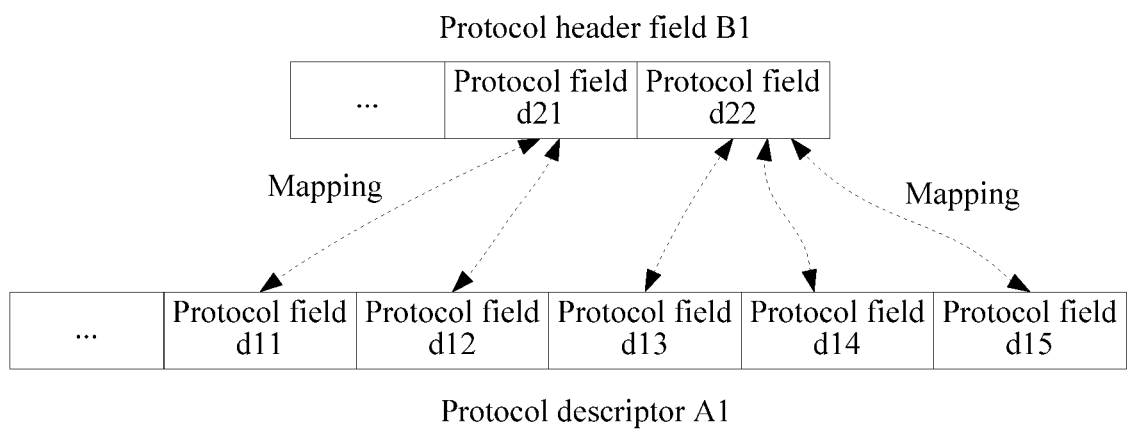
FIG. 2-c
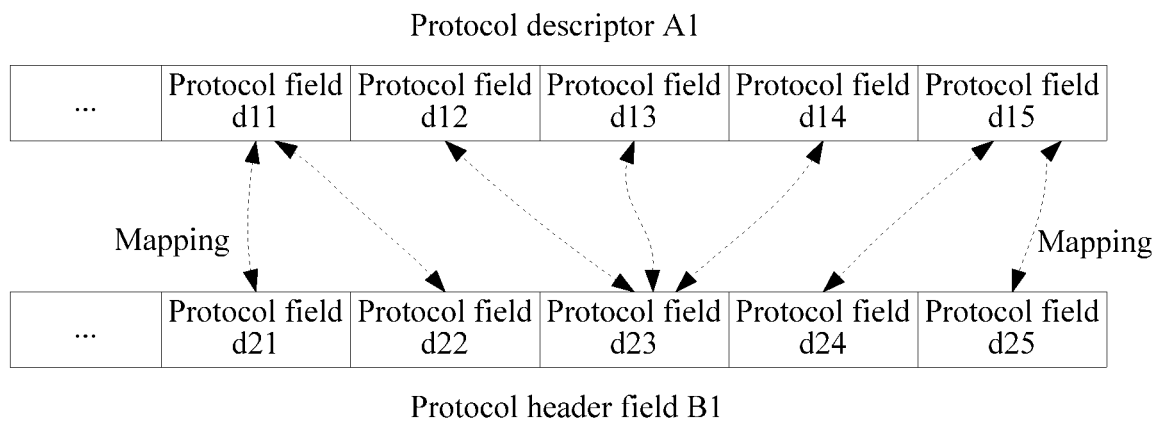
FIG. 2-d

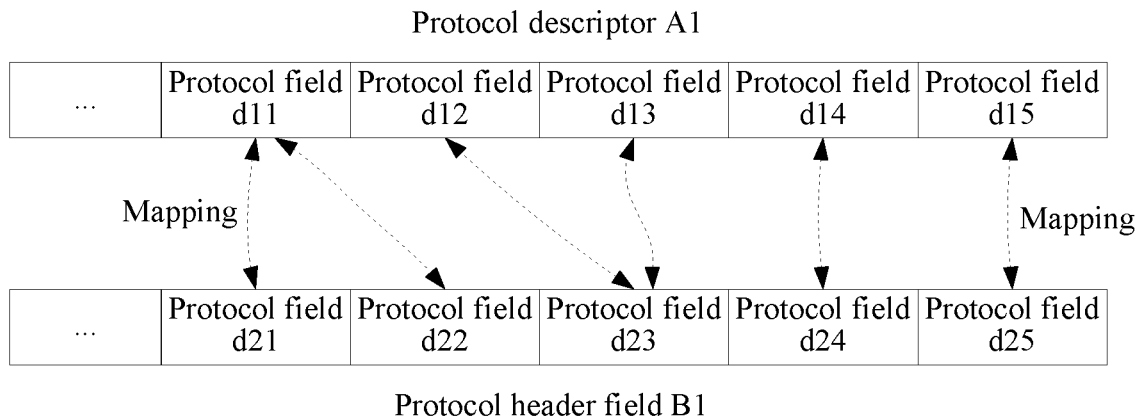
FIG. 2-e
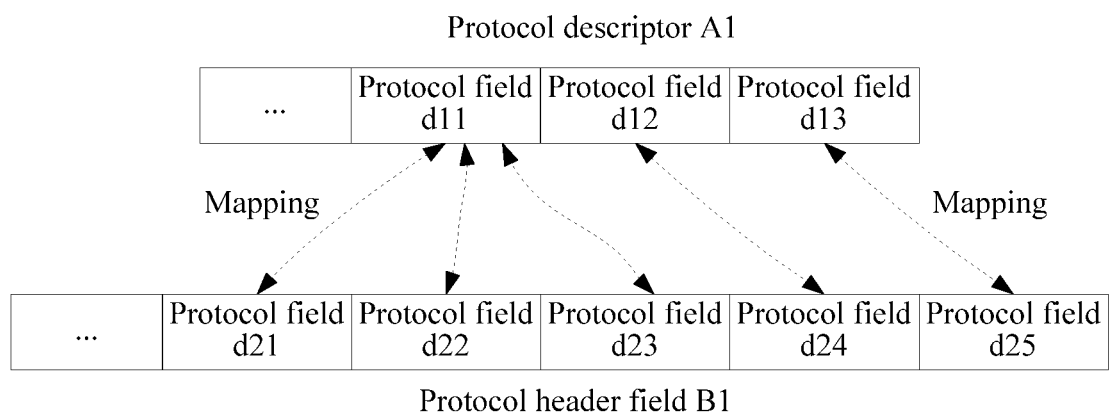
FIG. 2-f
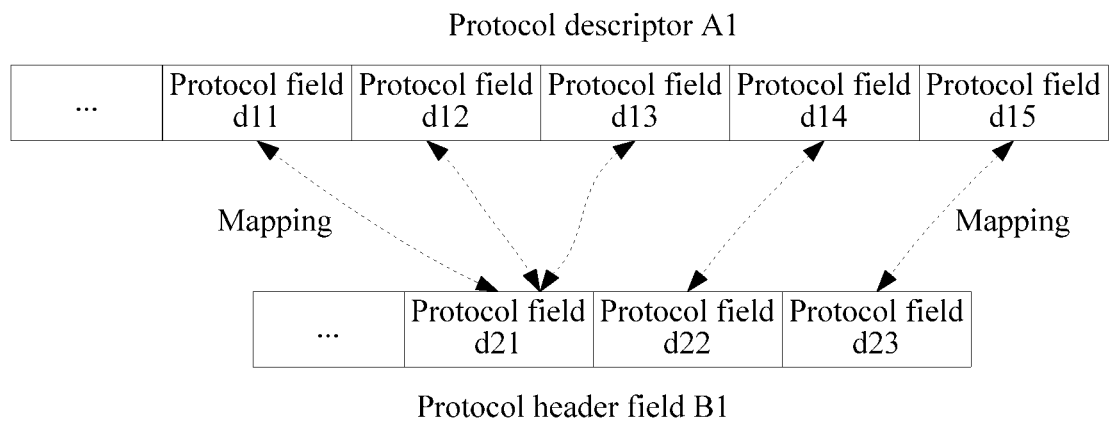
FIG. 2-g

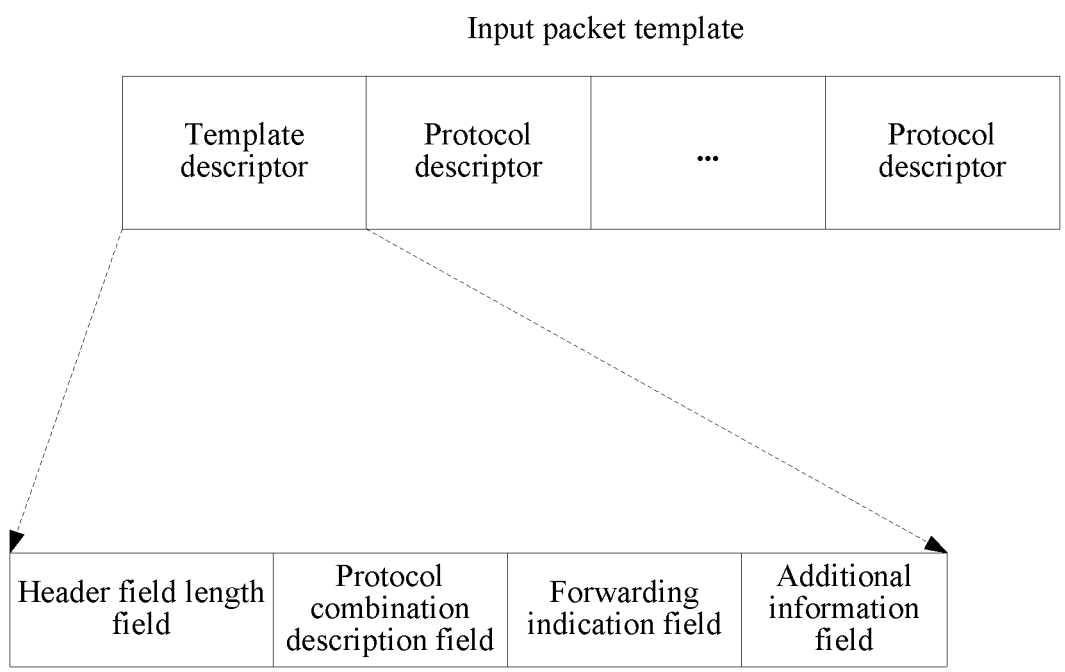
FIG. 2-h

IPv4 header field

| Version | IHL | Type of Service(TOS) | Total Length | |
|---|---|---|---|---|
| Identification | | | IP Flags x DM | Fragment Offset |
| Time to Live(TTL) | | Protocol | Header Checksum | |
| Source Address | | | | |
| Destination Address | | | | |

FIG. 4-a

IPv4 descriptor

| 3b | Protocol (Protocol) |
|---|---|
| 4b | Time to Live (Time to Live) |
| 4h | Header Checksum (Header Checksum) |
| 12w | Source Address (Source Address) |
| 13w | Destination Address (Destination Address) |
| 14w | First Word (First Word) |

| Version | IHL | Type of Service(TOS) | Total Length | |
|---|---|---|---|---|
| Identification | | | IP Flags x DM | Fragment Offset |

FIG. 4-b

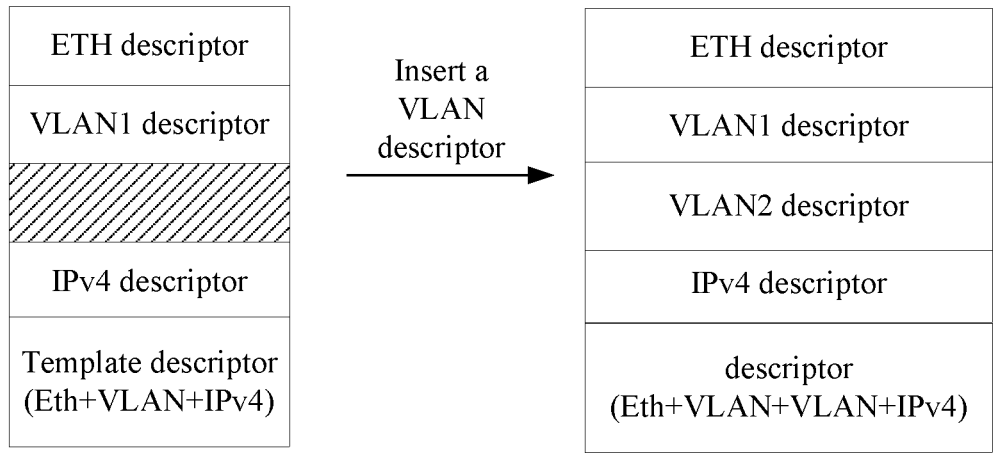
FIG. 4-c
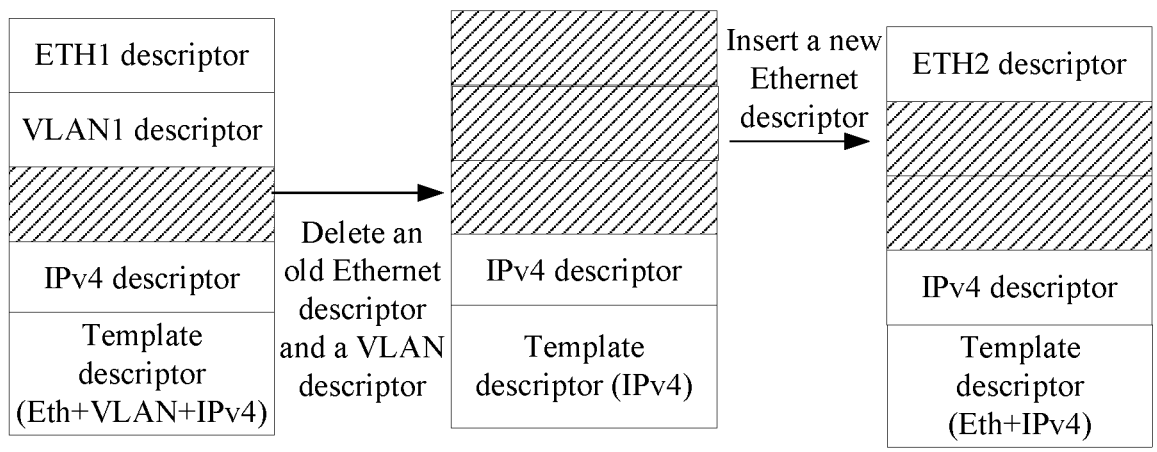
FIG. 4-d
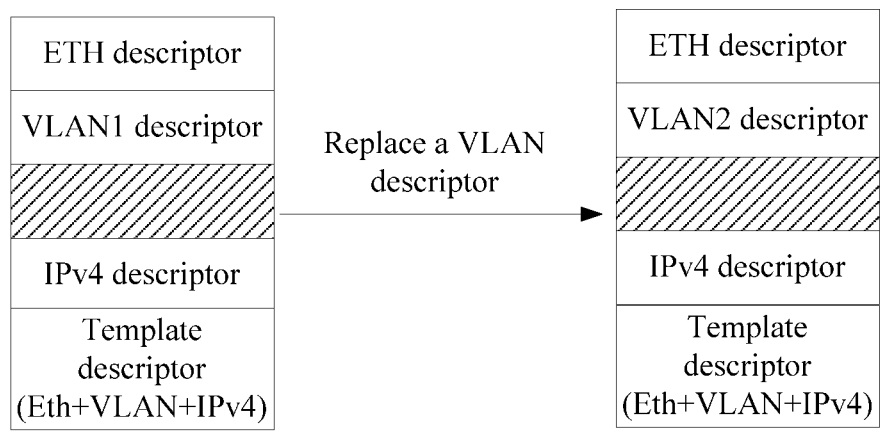
FIG. 4-e

PACKET EDIT PROCESSING METHOD AND RELATED DEVICE

CROSS-REFERENCE TO RELATED APPLICATIONS

This application is a continuation of U.S. patent application Ser. No. 15/365,606, filed on Nov. 30, 2016, which is a continuation of International Application No. PCT/CN2014/078917, filed on May 30, 2014. Both of the aforementioned applications are hereby incorporated by reference in their entireties.

TECHNICAL FIELD

The present application relates to the field of communication technologies, and in particular, to a packet edit processing method and a related device.

BACKGROUND

In a packet forwarding process, a packet forwarding device usually needs to perform, according to content of a packet, different forwarding actions such as layer 2 switching and layer 3 routing and forwarding. The different forwarding actions generally indicate that edit processing needs to be performed on the packet in different manners.

Therefore, packet edit processing is a quite elementary but extremely important function. Packet edit processing mainly refers to that a packet forwarding device sometimes needs to modify a received packet (for example, adding or deleting a particular-layer protocol header field of the packet, or changing a Time To Live (TTL) field of the packet) according to a forwarding requirement. Therefore, the packet edit processing may be seen as a generic term of a process of modifying and editing a received packet. Generally, a complex packet edit processing procedure may be seen as a combination of a plurality of basic packet editing operations. Basic packet editing operations may be classified into the following three types: inserting operations, deleting operations, and replacing operations. An inserting operation usually refers to inserting a segment of new data into the received packet, a deleting operation usually refers to deleting a segment of data from the received packet, and a replacing operation usually refers to replacing a segment of data in the received packet with new data. For example, forwarding of a packet S1 over an Ethernet may be seen as a combination of a series of packet editing operations, such as deleting an old Ethernet (Ethernet) header field from the packet S1, replacing a value of a TTL field of the packet S1 (for example, decrease the value of the TTL field by one), replacing a header checksum (checksum) field in an Internet Protocol (IP) header field of the packet S1, and inserting a new Ethernet packet header field into the packet S1.

In existing packet edit processing, packet edit processing is generally implemented by a processor, that is, actions of packet edit processing may be implemented by executing related programs by the processor. In this manner, packet data is generally stored in a consecutive address area, and a start address and an end address of the packet data are recorded. The processor directly moves and modifies the packet data according to operations that need to be performed. After processing is complete, the edited packet is sent out of the packet forwarding device. For example, it is assumed that the packet forwarding device receives a 64-byte Ethernet+IPv4 packet (that is, protocol header fields of the packet include an Ethernet header field and an IPv4 header field). In a packet edit processing procedure, it is required to add a Virtual Local Area Network (VLAN) tag and then output a 68-byte Ethernet+VLAN+IPv4 packet. In the packet edit processing procedure, a program in a packet editing part needs to first move data of the received packet from an address 12-64 to an address 16-68; however, in this process, at least (64−16)/4=12 processor instructions are needed, and in a process of writing 4-byte data of the VLAN tag into an address 12, one processor instruction is needed.

It is found, according to study and practice of the prior art, that complexity of instructions of editing packets in the prior art is generally high, packet edit processing such as inserting and deleting operations is quite slow because a large amount of data need to be moved, and as packet lengths increase, time required for inserting and deleting operations also increases.

SUMMARY

Embodiments of the present application provide a packet edit processing method and a related device, so as to reduce instruction complexity for packet edit processing and improve efficiency of packet edit processing.

According to a first aspect, an embodiment of the present application provides a packet edit processing method, where the method may include: generating an input packet template based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor; performing edit processing on the input packet template to obtain an output packet template; and converting, based on the preset protocol field mapping relationship, M protocol descriptors included in the obtained output packet template into M protocol header fields of an output packet, and replacing the N protocol header fields in the input packet with the M protocol header fields to obtain the output packet, where N and M are positive integers.

With reference to the first aspect, in a first possible implementation manner of the first aspect, the generating an input packet template based on N to-be-edited protocol header fields of an input packet, and a preset protocol field mapping relationship includes: determining, according to packet receiving information of the input packet, a packet parsing table corresponding to the input packet; invoking a parsing instruction sequence in the packet parsing table to generate the input packet template based on the N to-be-edited protocol header fields of the input packet.

With reference to the first aspect or the first possible implementation manner of the first aspect, in a second possible implementation manner of the first aspect, a first protocol field included in a first protocol descriptor in the N protocol descriptors has a mapping relationship with at least one protocol field included in a first protocol header field in the N protocol header fields, and the first protocol descriptor has a correspondence with the first protocol header field.

With reference to the first aspect, the first possible implementation manner of the first aspect, or the second possible implementation manner of the first aspect, in a third possible implementation manner of the first aspect, a second protocol field included in the first protocol header field in the N protocol header fields has a mapping relationship with at least one protocol field included in the first protocol descriptor in the N protocol descriptors, and the first protocol descriptor has a correspondence with the first protocol header field.

With reference to the first aspect, the first possible implementation manner of the first aspect, the second possible implementation manner of the first aspect, or the third possible implementation manner of the first aspect, in a fourth possible implementation manner of the first aspect, the input packet template further includes a template descriptor, where the template descriptor includes a protocol combination description field, and the protocol combination description field is used to describe a protocol type sequence corresponding to protocol descriptors included in the input packet template.

With reference to the fourth possible implementation manner of the first aspect, in a fifth possible implementation manner of the first aspect, the performing edit processing on the input packet template includes: determining an edit processing instruction sequence corresponding to the protocol type sequence, and invoking the determined edit processing instruction sequence to perform edit processing on the input packet template.

With reference to the fourth possible implementation manner of the first aspect or the fifth possible implementation manner of the first aspect, in a sixth possible implementation manner of the first aspect, the performing edit processing on the input packet template includes: creating at least one protocol descriptor in the input packet template, and updating the protocol combination description field in the template descriptor in the input packet template, so that the updated protocol combination description field describes a protocol type sequence corresponding to protocol descriptors currently included in the input packet template.

With reference to the fourth possible implementation manner of the first aspect or the fifth possible implementation manner of the first aspect, in a seventh possible implementation manner of the first aspect, the performing edit processing on the input packet template includes: deleting at least one protocol descriptor from the input packet template, and updating the protocol combination description field in the template descriptor in the input packet template, so that the updated protocol combination description field describes a protocol type sequence corresponding to protocol descriptors currently included in the input packet template.

With reference to the fourth possible implementation manner of the first aspect or the fifth possible implementation manner of the first aspect, in an eighth possible implementation manner of the first aspect, the performing edit processing on the input packet template includes: replacing at least one protocol descriptor in the input packet template.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner of the first aspect, the replacing the N protocol header fields in the input packet with the M protocol header fields to obtain the output packet includes: deleting the N protocol header fields from the input packet; and inserting the M protocol header fields into a position corresponding to the N protocol header fields deleted from the input packet.

According to a second aspect, the present application provides a packet edit processing apparatus, including: a packet parser, configured to generate an input packet template based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor; a template editing processor, configured to perform edit processing on the input packet template to obtain an output packet template; and a packet assembler, configured to convert, based on the preset protocol field mapping relationship, M protocol descriptors included in the obtained output packet template into M protocol header fields of an output packet, and replace the N protocol header fields in the input packet with the M protocol header fields to obtain the output packet, where N and M are positive integers.

With reference to the second aspect, in a first possible implementation manner of the second aspect, the packet parser may be specifically configured to: determine, according to packet receiving information of the input packet, a packet parsing table corresponding to the input packet, invoke a parsing instruction sequence in the packet parsing table to generate the input packet template based on the N to-be-edited protocol header fields of the input packet.

With reference to the second aspect or the first possible implementation manner of the second aspect, in a second possible implementation manner of the second aspect, a first protocol field included in a first protocol descriptor in the N protocol descriptors has a mapping relationship with at least one protocol field included in a first protocol header field in the N protocol header fields, and the first protocol descriptor has a correspondence with the first protocol header field.

With reference to the second aspect, the first possible implementation manner of the second aspect, or the second possible implementation manner of the second aspect, in a third possible implementation manner of the second aspect, a second protocol field included in the first protocol header field in the N protocol header fields has a mapping relationship with at least one protocol field included in the first protocol descriptor in the N protocol descriptors, and the first protocol descriptor has a correspondence with the first protocol header field.

With reference to the second aspect, the first possible implementation manner of the second aspect, the second possible implementation manner of the second aspect, or the third possible implementation manner of the second aspect, in a fourth possible implementation manner of the second aspect, the input packet template further includes a template descriptor, where the template descriptor includes a protocol combination description field, and the protocol combination description field is used to describe a protocol type sequence corresponding to protocol descriptors included in the input packet template.

With reference to the fourth possible implementation manner of the second aspect, in a fifth possible implementation manner of the second aspect, in the aspect of performing edit processing on the input packet template, the template editing processor may be specifically configured to: determine an edit processing instruction sequence corresponding to the protocol type sequence, and invoke the determined edit processing instruction sequence to perform edit processing on the input packet template.

With reference to the fourth possible implementation manner of the second aspect or the fifth possible implementation manner of the second aspect, in a sixth possible implementation manner of the second aspect, in the aspect of performing edit processing on the input packet template, the template editing processor is specifically configured to: create at least one protocol descriptor in the input packet template, and update the protocol combination description field in the template descriptor in the input packet template, so that the updated protocol combination description field describes a protocol type sequence corresponding to protocol descriptors currently included in the input packet template.

With reference to the fourth possible implementation manner of the second aspect or the fifth possible implementation manner of the second aspect, in a seventh possible implementation manner of the second aspect, in the aspect of performing edit processing on the input packet template, the template editing processor is specifically configured to: delete at least one protocol descriptor from the input packet template, and update the protocol combination description field in the template descriptor in the input packet template, so that the updated protocol combination description field describes a protocol type sequence corresponding to protocol descriptors currently included in the input packet template.

With reference to the fourth possible implementation manner of the second aspect or the fifth possible implementation manner of the second aspect, in an eighth possible implementation manner of the second aspect, in the aspect of performing edit processing on the input packet template, the template editing processor is specifically configured to replace at least one protocol descriptor in the input packet template.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, or the eighth possible implementation manner of the second aspect, in a ninth possible implementation manner of the second aspect, in the aspect of replacing the N protocol header fields in the input packet with the M protocol header fields to obtain the output packet, the packet assembler is specifically configured to: delete the N protocol header fields from the input packet; and insert the M protocol header fields into a position corresponding to the N protocol header fields deleted from the input packet.

According to a third aspect, the present application provides a packet forwarding device, where the device may include a processor and a memory; where the processor is configured to invoke code stored in the memory, so as to: generate an input packet template based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor; and perform edit processing on the input packet template to obtain an output packet template; and convert, based on the preset protocol field mapping relationship, M protocol descriptors included in the obtained output packet template into M protocol header fields of an output packet, and replace the N protocol header fields in the input packet with the M protocol header fields to obtain the output packet, where N and M are positive integers.

With reference to the third aspect, in a first possible implementation manner of the third aspect, in the aspect of generating an input packet template based on N to-be-edited protocol header fields of an input packet, and a preset protocol field mapping relationship, the processor is specifically configured to determine, according to packet receiving information of the input packet, a packet parsing table corresponding to the input packet; invoke a parsing instruction sequence in the packet parsing table to generate the input packet template based on the N to-be-edited protocol header fields of the input packet.

With reference to the third aspect or the first possible implementation manner of the third aspect, in a second possible implementation manner of the third aspect, a first protocol field included in a first protocol descriptor in the N protocol descriptors has a mapping relationship with at least one protocol field included in a first protocol header field in the N protocol header fields, and the first protocol descriptor has a correspondence with the first protocol header field.

With reference to the third aspect, the first possible implementation manner of the third aspect, or the second possible implementation manner of the third aspect, in a third possible implementation manner of the third aspect, a second protocol field included in the first protocol header field in the N protocol header fields has a mapping relationship with at least one protocol field included in the first protocol descriptor in the N protocol descriptors, and the first protocol descriptor has a correspondence with the first protocol header field.

With reference to the third aspect, the first possible implementation manner of the third aspect, the second possible implementation manner of the third aspect, or the third possible implementation manner of the third aspect, in a fourth possible implementation manner of the third aspect, the input packet template further includes a template descriptor, where the template descriptor includes a protocol combination description field, and the protocol combination description field is used to describe a protocol type sequence corresponding to protocol descriptors included in the input packet template.

With reference to the fourth possible implementation manner of the third aspect, in a fifth possible implementation manner of the third aspect, in the aspect of performing edit processing on the input packet template, the processor is specifically configured to: determine an edit processing instruction sequence corresponding to the protocol type sequence, and invoke the determined edit processing instruction sequence to perform edit processing on the input packet template.

With reference to the fourth possible implementation manner of the third aspect or the fifth possible implementation manner of the third aspect, in a sixth possible implementation manner of the third aspect, in the aspect of performing edit processing on the input packet template, the processor is specifically configured to: create at least one protocol descriptor in the input packet template, and update the protocol combination description field in the template descriptor in the input packet template, so that the updated protocol combination description field describes a protocol type sequence corresponding to protocol descriptors currently included in the input packet template.

With reference to the fourth possible implementation manner of the third aspect or the fifth possible implementation manner of the third aspect, in a seventh possible implementation manner of the third aspect, in the aspect of performing edit processing on the input packet template, the processor is specifically configured to: delete at least one protocol descriptor from the input packet template, and update the protocol combination description field in the template descriptor in the input packet template, so that the updated protocol combination description field describes a protocol type sequence corresponding to protocol descriptors currently included in the input packet template.

With reference to the fourth possible implementation manner of the third aspect or the fifth possible implementation manner of the third aspect, in an eighth possible implementation manner of the third aspect, in the aspect of performing edit processing on the input packet template, the processor is specifically configured to replace at least one protocol descriptor in the input packet template.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, or the eighth possible implementation manner of the third aspect, in a ninth possible implementation manner of the third aspect, in the aspect of replacing the N protocol header fields in the input packet with the M protocol header fields to obtain the output packet, the processor is specifically configured to: delete the N protocol header fields from the input packet; and insert the M protocol header fields into a position corresponding to the N protocol header fields deleted from the input packet.

According to a fourth aspect, the present application provides a computer storage medium, where the computer storage medium stores a program, and the program performs a part or all of steps in any packet edit processing method provided in the embodiments of the present application.

It can be learned that, in embodiments of the present application, an input packet template is first generated based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor; then, edit processing is performed on the input packet template to obtain an output packet template; and M protocol descriptors included in the output packet template are converted based on the preset protocol field mapping relationship into M protocol header fields of an output packet, and the foregoing N protocol header fields in the input packet are replaced with the M protocol header fields to obtain the output packet. During edit processing, edit processing is performed mainly on the input packet template instead of the entire input packet. Therefore, it helps reduce a data volume for edit processing, and further helps reduce instruction complexity for packet edit processing and improve efficiency of packet edit processing.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 1 is a schematic flowchart of a packet edit processing method according to an embodiment of the present application;

FIG. 2-a is a schematic diagram of a mapping relationship between a protocol field included in a protocol descriptor and a protocol field included in a protocol header field according to an embodiment of the present application;

FIG. 2-b is a schematic diagram of another mapping relationship between protocol fields in a protocol header field and protocol fields in a protocol descriptor according to an embodiment of the present application;

FIG. 2-c is a schematic diagram of another mapping relationship between protocol fields in a protocol header field and protocol fields in a protocol descriptor according to an embodiment of the present application;

FIG. 2-d is a schematic diagram of another mapping relationship between protocol fields in a protocol header field and protocol fields in a protocol descriptor according to an embodiment of the present application;

FIG. 2-e is a schematic diagram of another mapping relationship between protocol fields in a protocol header field and protocol fields in a protocol descriptor according to an embodiment of the present application;

FIG. 2-f is a schematic diagram of another mapping relationship between protocol fields in a protocol header field and protocol fields in a protocol descriptor according to an embodiment of the present application;

FIG. 2-g is a schematic diagram of another mapping relationship between protocol fields in a protocol header field and protocol fields in a protocol descriptor according to an embodiment of the present application;

FIG. 2-h is a schematic structural diagram of an input packet template according to an embodiment of the present application;

FIG. 4-a is a schematic structural diagram of an IPv4 header field according to an embodiment of the present application;

FIG. 4-b is a schematic structural diagram of an IPv4 descriptor according to an embodiment of the present application;

FIG. 4-c is a schematic diagram of adding a protocol descriptor to an input packet template according to an embodiment of the present application;

FIG. 4-d is a schematic diagram of deleting a protocol descriptor from an input packet template according to an embodiment of the present application;

FIG. 4-e is a schematic diagram of replacing a protocol descriptor in an input packet template according to an embodiment of the present application;

DETAILED DESCRIPTION OF ILLUSTRATIVE EMBODIMENTS

Figure 3:
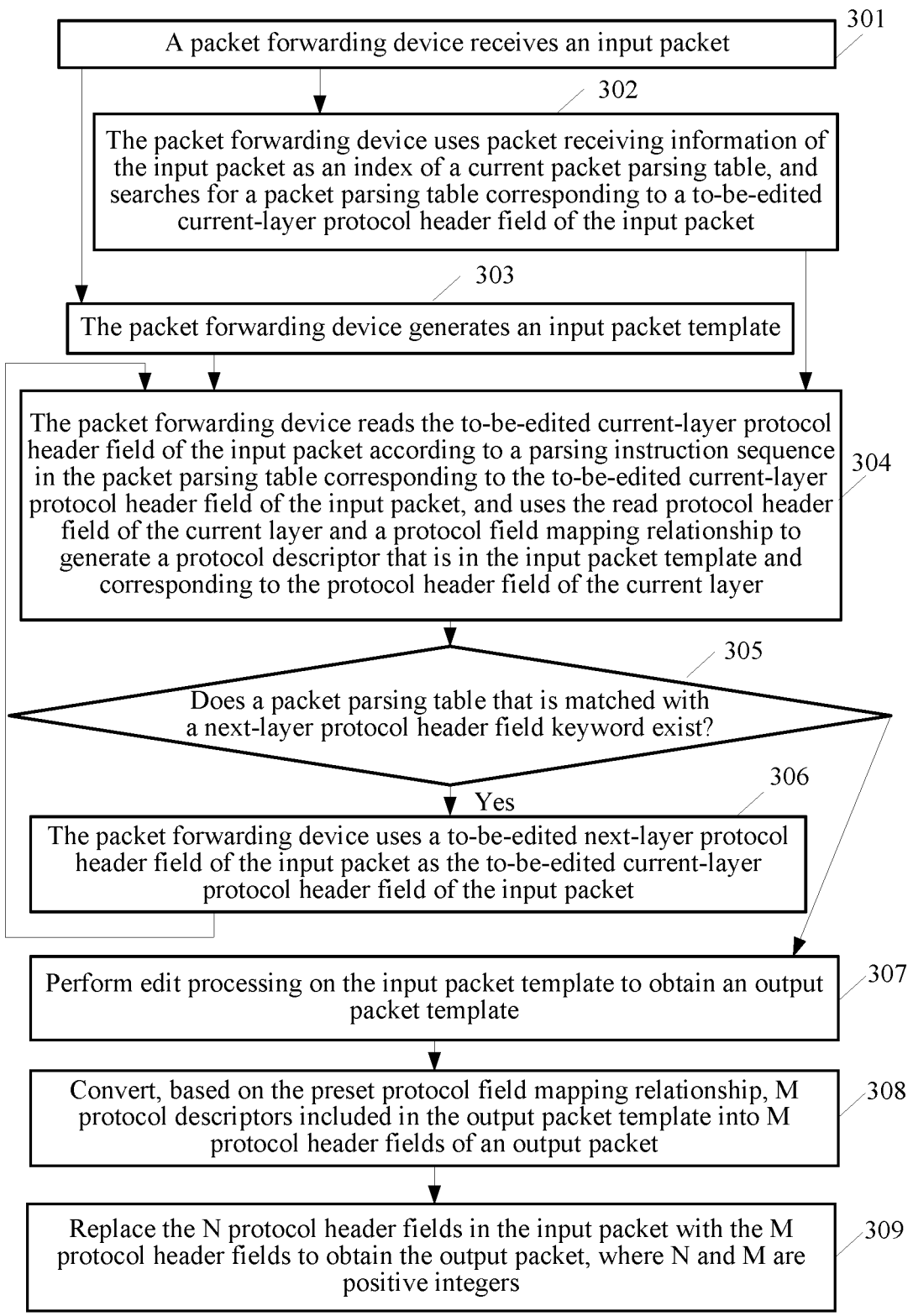
FIG. 3 is a schematic flowchart of another packet edit processing method according to an embodiment of the present application.

Embodiments of the present application provide a packet edit processing method and a related device, so as to reduce instruction complexity for packet forwarding and processing and improve efficiency of packet forwarding and processing.

The following separately uses specific embodiments for detailed description.

To make the application objectives, features, and advantages of the present application clearer and more comprehensible, the following clearly describes the technical solutions in the embodiments of the present application with reference to the accompanying drawings in the embodiments of the present application. Apparently, the embodiments described in the following are merely a part instead of all of the embodiments of the present application. All other embodiments obtained by a person of ordinary skill in the art based on the embodiments of the present application without creative efforts shall fall within the protection scope of the present application.

In the specification, claims, and accompanying drawings of the present application, the terms "first", "second", "third", "fourth", and so on (if existent) are intended to distinguish between different objects but do not necessarily indicate a specific sequence. In addition, the terms "include", "have", and their variations are intended to cover nonexclusive including. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In an embodiment of a packet edit processing method in the present application, the packet edit processing method may include: generating an input packet template based on N to-be-edited protocol header fields of an input packet, and a preset protocol field mapping relationship, where the foregoing input packet template includes N protocol descriptors that are corresponding, in a one-to-one manner, to the foregoing N protocol header fields, and the protocol field mapping relationship is a mapping relationship between a protocol field included in a protocol descriptor and a protocol field included in a protocol header field that has a correspondence with the protocol descriptor; performing edit processing on the foregoing input packet template to obtain an output packet template; and converting, based on the preset protocol field mapping relationship, M protocol descriptors included in the foregoing output packet template into M protocol header fields of an output packet, and replacing the foregoing N protocol header fields in the input packet with the foregoing M protocol header fields to obtain the output packet, where N and M are positive integers.

Referring to FIG. 1, FIG. 1 is a schematic flowchart of a packet edit processing method according to an embodiment of the present application. The packet edit processing method provided in this embodiment of the present application may include the following content:

101. Generate an input packet template based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor.

It may be understood that, a protocol header field has a one-to-one correspondence with a protocol descriptor; therefore, based on the foregoing N to-be-edited protocol header fields of the input packet, the N protocol descriptors that are corresponding, in a one-to-one manner, to the N protocol header fields may be obtained.

The foregoing N protocol header fields may include, for example: a VLAN tag, an Ethernet header field and/or an IPv4 header field, and the like, and correspondingly, the foregoing N protocol descriptors may include: a VLAN descriptor, an Ethernet descriptor and/or an IPv4 descriptor, and the like. A protocol descriptor corresponding to an Ethernet header field may be referred to as an Ethernet descriptor (that is, the Ethernet header field has a correspondence with the Ethernet descriptor). A protocol descriptor corresponding to a VLAN tag may also be referred to as a VLAN descriptor (that is, the VLAN tag has a correspondence with the VLAN descriptor). A protocol descriptor corresponding to an IPv4 header field may be referred to as an IPv4 descriptor (that is, the IPv4 header field has a correspondence with the IPv4 descriptor).

The foregoing preset protocol field mapping relationship is a mapping relationship between a protocol field included in a protocol descriptor and a protocol field included in a protocol header field that has a correspondence with the protocol descriptor; therefore, the protocol field mapping relationship may include, for example, a mapping relationship between protocol fields included in the VLAN tag and protocol fields included in the VLAN descriptor, a mapping relationship between protocol fields included in the IPv4 header field and protocol fields included in the IPv4 descriptor, or a mapping relationship between protocol fields included in the Ethernet header field and protocol fields included in the Ethernet descriptor. That is, the preset protocol field mapping relationship may indicate how to map protocol fields included in a protocol header field to protocol fields in a protocol descriptor that has a correspondence with the protocol header field; likewise, the preset protocol field mapping relationship may also indicate how to map protocol fields included in a protocol descriptor to protocol fields in a protocol header field that has a correspondence with the protocol descriptor. For example, the preset protocol field mapping relationship may indicate how to map protocol fields included in the IPv4 header field to protocol fields in the IPv4 descriptor, and may further indicate how to map protocol fields included in the IPv4 descriptor to protocol fields in the IPv4 header field; the preset protocol field mapping relationship may indicate how to map protocol fields included in the Ethernet header field to protocol fields in the Ethernet descriptor, and may further indicate how to map protocol fields included in the Ethernet descriptor to protocol fields in the Ethernet header field; the preset protocol field mapping relationship may indicate how to map protocol fields included in the VLAN tag to protocol fields in the VLAN descriptor, and may indicate how to map protocol fields included in the VLAN descriptor to protocol fields in the VLAN tag, and so on.

Therefore, a protocol descriptor that is in the input packet template and corresponding to a particular protocol header field may be generated based on the particular protocol header field and the preset protocol field mapping relationship; likewise, a protocol header field corresponding to a particular protocol descriptor in the input packet template may also be obtained, by means of conversion, based on the particular protocol descriptor in the input packet template and the preset protocol field mapping relationship. For example, the VLAN descriptor in the input packet template may be generated based on the VLAN tag and the preset protocol field mapping relationship; likewise, the VLAN tag may be obtained, by means of conversion, based on the preset protocol field mapping relationship and the VLAN descriptor in the input packet template. The IPv4 descriptor in the input packet template may be generated based on the IPv4 header field and the preset protocol field mapping relationship; and the IPv4 header field may also be obtained, by means of conversion, based on the preset protocol field mapping relationship and the IPv4 descriptor in the input packet template. The Ethernet descriptor in the input packet template may be generated based on the Ethernet header field and the preset protocol field mapping relationship; and the Ethernet header field may also be obtained, by means of conversion, based on the preset protocol field mapping relationship and the Ethernet descriptor in the input packet template. From this manner, other manners of conversion between a protocol header field and a protocol descriptor that have a correspondence may be deduced.

102. Perform edit processing on the input packet template to obtain an output packet template.

103. Convert, based on the preset protocol field mapping relationship, M protocol descriptors included in the output packet template into M protocol header fields of an output packet.

104. Replace the N protocol header fields in the input packet with the M protocol header fields to obtain the output packet, where N and M are positive integers.

N may be greater than, less than, or equal to the foregoing M.

For example, if a protocol descriptor is created in the foregoing input packet template in a process of performing edit processing on the input packet template, the foregoing M is greater than the foregoing N. If a protocol descriptor is deleted from the input packet template in the process of performing edit processing on the input packet template, the foregoing M is less than the foregoing N; if protocol descriptors are deleted from the input packet template and protocol descriptors are created in the input packet template in the process of performing edit processing on the input packet template, the foregoing M may be greater than, less than, or equal to the foregoing N.

It can be learned that, in this embodiment, an input packet template is first generated based on N to-be-edited protocol header fields of an input packet and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor; then, edit processing is performed on the input packet template to obtain an output packet template; and M protocol descriptors included in the output packet template are converted based on the preset protocol field mapping relationship into M protocol header fields of an output packet, and the foregoing N protocol header fields in the input packet are replaced with the M protocol header fields to obtain the output packet. During edit processing, edit processing is performed mainly on the input packet template instead of the entire input packet. Therefore, it helps reduce a data volume for edit processing, and further helps reduce instruction complexity for packet edit processing and improve efficiency of packet edit processing.

In some embodiments of the present application, the foregoing replacing the N protocol header fields in the input packet with the M protocol header fields to obtain the output packet may include: deleting the N protocol header fields from the input packet; and inserting the M protocol header fields into a position corresponding to the N protocol header fields deleted from the input packet.

In some embodiments of the present application, optionally, a first protocol field included in a first protocol descriptor in the foregoing N protocol descriptors may have a mapping relationship with at least one protocol field included in a first protocol header field in the foregoing N protocol header fields. Optionally, a second protocol field included in the foregoing first protocol header field may have a mapping relationship with at least one protocol field included in the foregoing first protocol descriptor. The foregoing first protocol descriptor has a correspondence with the foregoing first protocol header field. Optionally, protocol fields included in a second protocol descriptor in the foregoing N protocol descriptors may also have a one-to-one mapping relationship with protocol fields included in a second protocol header field in the foregoing N protocol header fields. The foregoing second protocol descriptor has a correspondence with the foregoing second protocol header field. The foregoing first protocol header field or the foregoing second protocol header field may be any protocol header field or a specific protocol header field in the foregoing N protocol header fields. The foregoing first protocol header field or the foregoing second protocol header field may be, for example, the Ethernet header field, the IPv4 header field, the VLAN tag, or the like.

That is, a quantity of protocol fields included in a protocol header field may be equal or not equal to a quantity of protocol fields included in a protocol descriptor, where the protocol header field and the protocol descriptor have a correspondence with each other, for example, a quantity of protocol fields included in the IPv4 header field may be equal or not equal to a quantity of protocol fields included in the IPv4 descriptor, a quantity of protocol fields included in the Ethernet header field may be equal or not equal to a quantity of protocol fields included in the Ethernet descriptor, and a quantity of protocol fields included in the VLAN tag may be equal or not equal to a quantity of protocol fields included in the VLAN descriptor.

For example, if any protocol field included in the first protocol descriptor (for example, an IPv4 descriptor) separately has a mapping relationship with a plurality of protocol fields included in the first protocol header field (for example, an IPv4 header field), a quantity of protocol fields included in the first protocol descriptor is less than a quantity of protocol fields included in the first protocol header field. For another example, if any protocol field included in the first protocol header field (for example, an Ethernet header field) separately has a mapping relationship with a plurality of protocol fields included in the first protocol descriptor (for example, an Ethernet descriptor), a quantity of protocol fields included in the first protocol descriptor is greater than a quantity of protocol fields included in the first protocol header field. For another example, if each protocol field in some protocol fields included in the first protocol descriptor (for example, an IPv4 descriptor) has a mapping relationship with a plurality of protocol fields included in the first protocol header field (for example, an IPv4 header field) and each protocol field in some protocol fields included in the first protocol header field has a mapping relationship with a plurality of protocol fields included in the first protocol descriptor, a quantity of protocol fields included in the first protocol descriptor may be greater than, less than, or equal to a quantity of protocol fields included in the first protocol header field. For another example, if protocol fields included in the second protocol descriptor have a one-to-one mapping relationship with protocol fields included in the foregoing second protocol header field, a quantity of protocol fields included in the second protocol descriptor is equal to a quantity of protocol fields included in the second protocol header field. Other scenarios can be deduced from this.

To help better understand the field mapping relationship, the following describes, by using examples and with reference to FIG. 2-a to FIG. 2-g, several field mapping relationships that may exist between protocol fields included in a protocol descriptor and a protocol header field that have a correspondence with each other. A protocol descriptor A1 and a protocol header field B1 in FIG. 2-a to FIG. 2-g have a correspondence with each other.

Refer to FIG. 2-a to FIG. 2-g. FIG. 2-a exemplarily shows that protocol fields in the protocol descriptor A1 have a one-to-one mapping relationship with fields in the protocol header field B1. Specifically, a protocol field d11 in the protocol descriptor A1 has a mapping relationship with a protocol field d21 in the protocol header field B1 (that is, the protocol field d11 may be obtained, by means of conversion, based on the protocol field d21 in the protocol header field B1); a protocol field d12 in the protocol descriptor A1 has a mapping relationship with a protocol field d22 in the protocol header field B1 (that is, the protocol field d12 may be obtained, by means of conversion, based on the protocol field d22 in the protocol header field B1); a protocol field d13 in the protocol descriptor A1 has a mapping relationship with a protocol field d23 in the protocol header field B1 (that is, the protocol field d13 may be obtained, by means of conversion, based on the protocol field d23 in the protocol header field B1); a protocol field d14 in the protocol descriptor A1 has a mapping relationship with a protocol field d24 in the protocol header field B1 (that is, the protocol field d14 may be obtained, by means of conversion, based on the protocol field d24 in the protocol header field B1); and so on.

For another example, as shown in FIG. 2-b, FIG. 2-b exemplarily shows that between a protocol field in a protocol descriptor A1 may have a mapping relationship with a plurality of protocol fields in a protocol header field B1. Specifically, a protocol field d11 in the protocol descriptor A1 has a mapping relationship with protocol fields d21 and d22 in the protocol header field B1 (that is, the protocol field d11 may be obtained, by means of conversion, based on the protocol fields d21 and d22 in the protocol header field B1); likewise, a protocol field d12 in the protocol descriptor A1 has a mapping relationship with protocol fields d23, d24, and d25 in the protocol header field B1 (that is, the protocol field d12 may be obtained, by means of conversion, based on the protocol fields d23, d24, and d25 in the protocol header field B1); and so on.

For another example, as shown in FIG. 2-c, FIG. 2-c exemplarily shows that a protocol field in a protocol header field B1 may have a mapping relationship with a plurality of protocol fields in a protocol descriptor A1. Specifically, a protocol field d21 in the protocol header field B1 has a mapping relationship with protocol fields d11 and d12 in the protocol descriptor A1 (that is, the protocol fields d11 and d12 in the protocol descriptor A1 may be obtained, by means of conversion, based on the protocol field d21); likewise, a protocol field d22 in the protocol header field B1 has a mapping relationship with protocol fields d13, d14, and d15 in the protocol descriptor A1 (that is, the protocol fields d13, d14, and d15 in the protocol descriptor A1 may be obtained, by means of conversion, based on the protocol field d22); and so on.

For another example, as shown in FIG. 2-d, FIG. 2-d exemplarily shows that a protocol field in a protocol header field B1 has a mapping relationship with a plurality of protocol fields in a protocol descriptor A1, and another protocol field in the protocol descriptor A1 has a mapping relationship with a plurality of other protocol fields in the protocol header field B1. Specifically, FIG. 2-d exemplarily shows that a protocol field d11 in the protocol descriptor A1 has a mapping relationship with protocol fields d21 and d22 in the protocol header field B1 (that is, the protocol field d11 may be obtained, by means of conversion, based on the protocol fields d21 and d22 in the protocol header field B1); a protocol field d15 in the protocol descriptor A1 has a mapping relationship with protocol fields d24 and d25 in the protocol header field B1 (that is, the protocol field d15 may be obtained, by means of conversion, based on the protocol fields d24 and d25 in the protocol header field B1); a protocol field d23 in the protocol header field B1 has a mapping relationship with protocol fields d12, d13, and d14 in the protocol descriptor A1 (that is, the protocol fields d12, d13, and d13 in the protocol descriptor A1 may be obtained, by means of conversion, based on the protocol field d23 in the protocol header field B1); and so on.

For another example, as shown in FIG. 2-e, FIG. 2-e exemplarily shows that a protocol field in a protocol header field B1 has a mapping relationship with a plurality of protocol fields in a protocol descriptor A1, another protocol field in the protocol descriptor A1 has a mapping relationship with a plurality of other protocol fields in the protocol header field B1, and still another protocol field in the protocol descriptor A1 has a mapping relationship with still another protocol field in the protocol header field B1. Specifically, FIG. 2-e exemplarily shows that a protocol field d11 in the protocol descriptor A1 has a mapping relationship with protocol fields d21 and d22 in the protocol header field B1 (that is, the protocol field d11 may be obtained, by means of conversion, based on the protocol fields d21 and d22 in the protocol header field B1); a protocol field d23 in the protocol header field B1 has a mapping relationship with protocol fields d12 and d13 in the protocol descriptor A1 (that is, the protocol fields d12 and d13 may be obtained, by means of conversion, based on the protocol field d23 in the protocol header field B1); a protocol field d15 in the protocol descriptor A1 has a mapping relationship with a protocol field d25 in the protocol header field B1 (that is, the protocol field d15 may be obtained, by means of conversion, based on the protocol field d25 in the protocol header field B1); a protocol field d14 in the protocol descriptor A1 has a mapping relationship with a protocol field d24 in the protocol header field B1 (that is, the protocol field d14 may be obtained, by means of conversion, based on the protocol field d24 in the protocol header field B1); and so on.

For another example, as shown in FIG. 2-f, FIG. 2-f exemplarily shows that a protocol field in a protocol descriptor A1 has a mapping relationship with a plurality of protocol fields in a protocol header field B1, and still another protocol field in the protocol descriptor A1 has a mapping relationship with still another protocol field in the protocol header field B1. Specifically, FIG. 2-f exemplarily shows that a protocol field d11 in the protocol descriptor A1 has a mapping relationship with protocol fields d21, d22, and d23 in the protocol header field B1 (that is, the protocol field d11 may be obtained, by means of conversion, based on the protocol fields d21, d22, and d23 in the protocol header field B1); a protocol field d12 in the protocol descriptor A1 has a mapping relationship with a protocol field d24 in the protocol header field B1 (that is, the protocol field d12 may be obtained, by means of conversion, based on the protocol field d24 in the protocol header field B1); a protocol field d13 in the protocol descriptor A1 has a mapping relationship with a protocol field d25 in the protocol header field B1 (that is, the protocol field d13 may be obtained, by means of conversion, based on the protocol field d25 in the protocol header field B1); and so on.

For another example, as shown in FIG. 2-g, FIG. 2-g exemplarily shows that a protocol field in a protocol header field B1 has a mapping relationship with a plurality of protocol fields in a protocol descriptor A1, and still another protocol field in the protocol descriptor A1 has a mapping relationship with still another protocol field in the protocol header field B1. Specifically, FIG. 2-g exemplarily shows that a protocol field d21 in the protocol header field B1 has a mapping relationship with protocol fields d11, d12, and d13 in the protocol descriptor A1 (that is, the protocol fields d11, d12, and d13 in the protocol descriptor A1 may be obtained, by means of conversion, based on the protocol field d21 in the protocol header field B1); a protocol field d14 in the protocol descriptor A1 has a mapping relationship with a protocol field d22 in the protocol header field B1 (that is, the protocol field d14 may be obtained, by means of conversion, based on the protocol field d22 in the protocol header field B1); a protocol field d15 in the protocol descriptor A1 has a mapping relationship with a protocol field d23 in the protocol header field B1 (that is, the protocol field d15 may be obtained, by means of conversion, based on the protocol field d23 in the protocol header field B1); and so on.

It may be understood that, the several possible field mapping relationships that are described in FIG. 2-a to FIG. 2-g and between protocol fields included in a protocol descriptor and protocol fields included in a protocol header field are only used as examples. Certainly, protocol fields included in a protocol descriptor and protocol fields included in a protocol header field may also have other field mapping relationships, which are not exhaustively listed herein.

In some embodiments of the present application, the foregoing generating an input packet template based on N to-be-edited protocol header fields of an input packet, and a preset protocol field mapping relationship may include: determining, according to packet receiving information (for example, a receiving port number and/or a receiving channel number) of the input packet, a packet parsing table corresponding to the input packet; invoking a parsing instruction sequence in the packet parsing table to generate the input packet template based on the N to-be-edited protocol header fields of the input packet. For example, different protocol header fields may be corresponding to different packet parsing tables, or one packet parsing table may be corresponding to a plurality of protocol header fields.

In some embodiments of the present application, the foregoing input packet template may further include a template descriptor, where the template descriptor may include a protocol combination description field, and the protocol combination description field is used to describe a protocol type sequence corresponding to protocol descriptors included in the input packet template. Likewise, the output packet template may also include a template descriptor, where the template descriptor may include a protocol combination description field, and the protocol combination description field is used to describe a protocol type sequence corresponding to protocol descriptors included in the output packet template. It may be understood that when a protocol descriptor included in the input packet template changes, the protocol combination description field may be adaptively updated, so that the protocol combination description field may describe a protocol type sequence corresponding to protocol descriptors currently included in the input packet template.

Optionally, the template descriptor in the input packet template may further include a header field length field that is used to record a total length of protocol header fields corresponding to the protocol descriptors included in the foregoing input packet template. It may be understood that when a protocol descriptor included in the input packet template changes, the header field length field in the template descriptor may be adaptively updated, so that the header field length field may describe a total length of protocol header fields corresponding to the protocol descriptors currently included in the input packet template. For example, it is assumed that the input packet template includes two protocol descriptors, and a total length of protocol header fields corresponding to the two protocol descriptors is 50 bytes (in this case, a value recorded in the header field length field is 50 bytes); and if one VLAN descriptor is created in the input packet template in a process of performing edit processing on the input packet template, where a length of a VLAN tag corresponding to the VLAN descriptor is 4 bytes, the value recorded in the header field length field may be updated to 54 bytes. For another example, it is assumed that the input packet template includes three protocol descriptors, and a total length of protocol header fields corresponding to the three protocol descriptors is 68 bytes (in this case, a value recorded in the header field length field is 68 bytes); and if one VLAN descriptor is deleted from the input packet template in a process of performing edit processing on the foregoing input packet template, where a length of a VLAN tag corresponding to the VLAN descriptor is 4 bytes, the value recorded in the header field length field may be updated to 64 bytes. Other cases can be deduced from this.

Optionally, the foregoing template descriptor may further include a forwarding indication field that is used to record a forwarding manner of the input packet. Optionally, the template descriptor may further include an additional information field that is used to record additional information (receiving port number and/or receiving channel number of a packet) corresponding to the input packet. Certainly, the foregoing template descriptor may also include another field.

Referring to FIG. 2-h, FIG. 2-h exemplarily shows a data structure of an input packet template, where the input packet template exemplarily shown in FIG. 2-h includes a template descriptor and at least one protocol descriptor. An output packet template may have a structure similar to that of the input packet template. Certainly, a specific structure of the input and output packet templates is not limited to the example shown in FIG. 2-h, and may be set according to a specific scenario.

In some embodiments of the present application, the foregoing performing edit processing on the input packet template may include, for example: determining an edit processing instruction sequence corresponding to the foregoing protocol type sequence, and invoking the determined edit processing instruction sequence to perform edit processing on the input packet template. Specifically, for each protocol type sequence, at least one edit processing instruction sequence may be preset; therefore, after the input packet template is generated, an edit processing instruction sequence corresponding to a protocol type sequence may be determined according to the protocol type sequence corresponding to protocol descriptors included in the input packet template, and the determined edit processing instruction sequence may be used to perform edit processing on the foregoing input packet template. It may be understood that if a corresponding edit processing instruction sequence is preset for a different protocol type sequence, it may be not required to temporarily generate an edit processing instruction sequence when edit processing is performed on the foregoing input packet template, which helps reduce instruction complexity and simplify computing complexity for edit processing.

In some embodiments of the present application, the foregoing performing edit processing on the input packet template may include, for example: creating at least one protocol descriptor in the input packet template, and further updating the protocol combination description field in the template descriptor in the input packet template, so that the updated protocol combination description field describes a protocol type sequence corresponding to protocol descriptors currently included in the input packet template.

In some embodiments of the present application, the foregoing performing edit processing on the input packet template may include, for example: deleting at least one protocol descriptor from the input packet template, and further updating the protocol combination description field in the template descriptor in the input packet template, so that the updated protocol combination description field describes a protocol type sequence corresponding to protocol descriptors currently included in the input packet template.

In some embodiments of the present application, the foregoing performing edit processing on the input packet template may include, for example: replacing at least one protocol descriptor in the input packet template. Because the at least one protocol descriptor is replaced, and a protocol type sequence corresponding to the input packet template may not change, it may be not required to update the protocol combination description field in the template descriptor in the input packet template.

It may be understood that replacing of one protocol descriptor in the input packet template may be broken down into that: one old protocol descriptor in the input packet template is first deleted and then one new protocol descriptor is created in the input packet template.

It may be understood that the performing edit processing on the input packet template may not definitely be: merely deleting some protocol descriptors from the input packet template or merely creating some new protocol descriptors in the input packet template. It may be that: it is required to delete some protocol descriptors from the input packet template, it is also required to create some protocol descriptors in the input packet template, and even it is further required to replace some protocol descriptors in the input packet template.

The instruction (for example, parsing instruction or edit processing instruction) mentioned in each embodiment of the present application may be, for example, a microcode instruction or an instruction of another type; the instruction sequence (for example, parsing instruction sequence or edit processing instruction sequence) mentioned in each embodiment of the present application may be, for example, a microcode instruction sequence or an instruction sequence of another type.

It may be understood that the foregoing solutions in this embodiment may be performed by a packet forwarding device, where the packet forwarding device may be, for example, a router, a switch, a firewall, or another device.

To help better understand and implement the foregoing solutions in this embodiment of the present application, some specific application scenarios are used as examples in the following description.

Referring to FIG. 3, FIG. 3 is a schematic flowchart of a packet edit processing method according to an embodiment of the present application. The packet edit processing method provided in the another embodiment of the present application may include the following content:

301. A packet forwarding device receives an input packet.

302. The packet forwarding device uses packet receiving information (for example, receiving port number and receiving channel number) of the input packet as an index of a current packet parsing table, and searches for a packet parsing table corresponding to a to-be-edited current-layer protocol header field of the input packet.

For example, a receiving port number has a correspondence with a packet parsing table; therefore, the packet parsing table corresponding to the current to-be-edited protocol header field of the input packet may be found according to the receiving port number of the input packet. Alternatively, a receiving channel number has a correspondence with a packet parsing table; therefore, the packet parsing table corresponding to the current to-be-edited protocol header field of the input packet may be found according to the receiving channel number of the input packet. Alternatively, a receiving port number and a receiving channel number have a correspondence with a packet parsing table; therefore, the packet parsing table corresponding to the current to-be-edited protocol header field of the input packet may be found according to the receiving port number and the receiving channel number of the input packet.

303. The packet forwarding device generates an input packet template.

The input packet template generated at this moment is an initial input packet template, where the initial input packet template may not include any protocol descriptor, or includes several empty protocol descriptors, a template descriptor in the initial input packet template may include a protocol combination description field, and the protocol combination description field is used to describe a protocol type sequence corresponding to protocol descriptors included in the input packet template. It may be understood that because the initial input packet template may not include any protocol descriptor, or includes several empty protocol descriptors, the protocol combination description field included in the template descriptor in the initial input packet template is empty or records an invalid value. When a protocol descriptor included in the input packet template changes, the protocol combination description field may be adaptively updated, so that the protocol combination description field may describe a protocol type sequence corresponding to protocol descriptors currently included in the input packet template.

Optionally, the template descriptor in the input packet template may further include a header field length field that is used to record a total length of protocol header fields corresponding to the protocol descriptors included in the foregoing input packet template. It may be understood that because the initial input packet template does not include any protocol descriptor, or includes several empty protocol descriptors, the header field length field included in the template descriptor in the initial input packet template is empty or records an invalid value. When a protocol descriptor included in the input packet template changes, the header field length field in the template descriptor may be adaptively updated, so that the header field length field may describe a total length of protocol header fields corresponding to the protocol descriptors currently included in the input packet template.

Optionally, the foregoing template descriptor may further include a forwarding indication field that is used to record a forwarding manner of the input packet. Optionally, the template descriptor may further include an accessory information field that is used to record additional information (receiving port number and/or receiving channel number of a packet) corresponding to the input packet. Certainly, the foregoing template descriptor may also include another field.

304. The packet forwarding device reads the to-be-edited current-layer protocol header field of the input packet according to a parsing instruction sequence in the packet parsing table corresponding to the to-be-edited current-layer protocol header field of the input packet, and uses the read current-layer protocol header field and a protocol field mapping relationship to generate a protocol descriptor that is in the input packet template and corresponding to the current-layer protocol header field.

Because a protocol descriptor included in the input packet template changes, the packet forwarding device may further update the header field length field in the template descriptor, so that the header field length field may describe the total length of protocol header fields corresponding to the protocol descriptors currently included in the input packet template; and the packet forwarding device may further update the protocol combination description field, so that the protocol combination description field may describe the protocol type sequence corresponding to the protocol descriptors currently included in the input packet template.

The foregoing protocol field mapping relationship is a mapping relationship between a protocol field included in a protocol descriptor and a protocol field included in a protocol header field that has a correspondence with the protocol descriptor.

305. The packet forwarding device uses a keyword of a next-layer protocol header field that is included in the to-be-edited current-layer protocol header field of the input packet as an index, and searches for whether a packet parsing table that is matched with the keyword of the next-layer protocol header field exists, where the packet parsing table that is matched with the keyword of the next-layer protocol header field is a packet parsing table corresponding to the to-be-edited next-layer protocol header field of the input packet.

If the packet parsing table that is matched with the keyword of the next-layer protocol header field exists, step 306 is performed.

If the packet parsing table that is matched with the keyword of the next-layer protocol header field does not exist, step 307 is performed. If it is found that the packet parsing table that is matched with the keyword of the next-layer protocol header field does not exist, it indicates that N to-be-edited protocol header fields of the input packet have been processed completely.

306. The packet forwarding device uses the to-be-edited next-layer protocol header field of the input packet as the to-be-edited current-layer protocol header field of the input packet, and jumps to step 304.

307. The packet forwarding device edits and processes the current input packet template to obtain an output packet template.

The current input packet template may include a template descriptor and N protocol descriptors (the N protocol descriptors are corresponding, in a one-to-one manner, to the N to-be-edited protocol header fields of the input packet).

It may be understood that, a protocol header field has a one-to-one correspondence with a protocol descriptor; therefore, based on the foregoing N to-be-edited protocol header fields of the input packet, the N protocol descriptors that are corresponding, in a one-to-one manner, to the N protocol header fields may be obtained.

The foregoing N protocol header fields may include, for example: a VLAN tag, an Ethernet header field and/or an IPv4 header field, and the like, and correspondingly, the foregoing N protocol descriptors may include: a VLAN descriptor, an Ethernet descriptor and/or an IPv4 descriptor, and the like. A protocol descriptor corresponding to an Ethernet header field may be referred to as an Ethernet descriptor (that is, the Ethernet header field has a correspondence with the Ethernet descriptor). A protocol descriptor corresponding to a VLAN tag may also be referred to as a VLAN descriptor (that is, the VLAN tag has a correspondence with the VLAN descriptor). A protocol descriptor corresponding to an IPv4 header field may be referred to as an IPv4 descriptor (that is, the IPv4 header field has a correspondence with the IPv4 descriptor).

The foregoing preset protocol field mapping relationship is a mapping relationship between a protocol field included in a protocol descriptor and a protocol field included in a protocol header field that has a correspondence with the protocol descriptor; therefore, the protocol field mapping relationship may include, for example, a mapping relationship between protocol fields included in the VLAN tag and protocol fields included in the VLAN descriptor, a mapping relationship between protocol fields included in the IPv4 header field and protocol fields included in the IPv4 descriptor, or a mapping relationship between protocol fields included in the Ethernet header field and protocol fields included in the Ethernet descriptor. That is, the preset protocol field mapping relationship may indicate how to map protocol fields included in a protocol header field to protocol fields in a protocol descriptor that has a correspondence with the protocol header field; likewise, the preset protocol field mapping relationship may also indicate how to map protocol fields included in a protocol descriptor to protocol fields in a protocol header field that has a correspondence with the protocol descriptor. For example, the preset protocol field mapping relationship may indicate how to map protocol fields included in the IPv4 header field to protocol fields in the IPv4 descriptor, and may further indicate how to map protocol fields included in the IPv4 descriptor to protocol fields in the IPv4 header field; the preset protocol field mapping relationship may indicate how to map protocol fields included in the Ethernet header field to protocol fields in the Ethernet descriptor, and may further indicate how to map protocol fields included in the Ethernet descriptor to protocol fields in the Ethernet header field; the preset protocol field mapping relationship may indicate how to map protocol fields included in the VLAN tag to protocol fields in the VLAN descriptor, and may further indicate how to map protocol fields included in the VLAN descriptor to protocol fields in the VLAN tag, and so on.

Therefore, a protocol descriptor that is in the input packet template and corresponding to a particular protocol header field may be generated based on the particular protocol header field and the preset protocol field mapping relationship; likewise, a protocol header field corresponding to a particular protocol descriptor in the input packet template may also be obtained, by means of conversion, based on the particular protocol descriptor in the input packet template and the preset protocol field mapping relationship. For example, the VLAN descriptor in the input packet template may be generated based on the VLAN tag, and the preset protocol field mapping relationship; likewise, the VLAN tag may be obtained, by means of conversion, based on the preset protocol field mapping relationship and the VLAN descriptor in the input packet template. The IPv4 descriptor in the input packet template may be generated based on the IPv4 header field and the preset protocol field mapping relationship; and the IPv4 header field may also be obtained, by means of conversion, based on the preset protocol field mapping relationship and the IPv4 descriptor in the input packet template. The Ethernet descriptor in the input packet template may be generated based on the Ethernet header field and the preset protocol field mapping relationship; and the Ethernet header field may also be obtained, by means of conversion, based on the preset protocol field mapping relationship and the Ethernet descriptor in the input packet template. From this manner, other manners of conversion between a protocol header field and a protocol descriptor that have a correspondence may be deduced.

A protocol descriptor may be recorded in registers with a same width or different widths such as 8 bit, 8 bit, 16 bit, 32 bit, 64 bit, and 128 bit. After the input packet template is determined, storage locations of fields in the protocol descriptor may be fixed. If the storage locations of the fields in the protocol descriptor are relatively fixed, it helps further simplify complexity of an edit processing instruction because in this case, the edit processing instruction may be directly set according to an address regardless of specific content in the address.

Protocol fields included in the protocol descriptor are not required to be corresponding, in a one-to-one manner, to protocol fields in the protocol header field and may be flexibly configured according to a forwarding service. In different forwarding applications, a same protocol header field may correspond to protocol descriptors in different data formats. Meanwhile, for a protocol descriptor, it is not required that all data of the protocol descriptor is distributed in consecutive storage space.

For example, assuming that an IPv4 header field of an input packet is shown in FIG. 4-*a*, an IPv4 descriptor corresponding to the IPv4 header field of the input packet may be shown in FIG. 4-*b*. It is assumed that data of a start 4-byte of the IPv4 header field is not used in a forwarding process; therefore, a register with a length of 4 bytes may be assigned, and the data of the start 4-byte of the IPv4 header field is stored as a complete word in a number 14 register. A data structure of the IPv4 descriptor may be obtained, by means of compilation, by using a packet parser of a Protocol Oblivious Forwarding mechanism, or may be specified by a user.

FIG. 4-*a* and FIG. 4-*b* collectively show a mapping relationship between protocol fields included in an IPv4 descriptor and protocol fields included in an IPv4 header field; certainly, it is not limited to such a mapping relationship; and another mapping relationship between a protocol field included in a protocol descriptor and a protocol field included in a protocol header field that has a correspondence with the protocol descriptor may be deduced from this. For example, the Protocol field in the IPv4 header field in FIG. 4-*a* is mapped to the Protocol field in the IPv4 descriptor shown in FIG. 4-*b*; the TTL field in the IPv4 header field is mapped to the TTL field in the IPv4 descriptor; and the Source Address field in the IPv4 header field is mapped to the Source Address field in the IPv4 descriptor. The Version field, the IHL field, the Type of Service (TOS) field, the Total Length field, the Identification field, the IP Flags×DM field, and the Fragment Offset field in the IPv4 header field are mapped to the First Word field of the IPv4 descriptor. Mapping relationships of other protocol fields are shown in FIG. 4-*a* and FIG. 4-*b*, and details are not described herein again.

In some embodiments of the present application, the foregoing performing edit processing on the input packet template may include, for example: determining an edit processing instruction sequence corresponding to the foregoing protocol type sequence, and invoking the determined edit processing instruction sequence to perform edit processing on the input packet template. Specifically, for each protocol type sequence, at least one edit processing instruction sequence may be preset; therefore, after the input packet template is generated, an edit processing instruction sequence corresponding to a protocol type sequence may be determined according to the protocol type sequence corresponding to protocol descriptors included in the input packet template, and the determined edit processing instruction sequence may be used to perform edit processing on the foregoing input packet template. It may be understood that if a corresponding edit processing instruction sequence is preset for a different protocol type sequence, it may be not required to temporarily generate an edit processing instruction sequence when edit processing is performed on the foregoing input packet template, which helps reduce instruction complexity and simplify computing complexity for edit processing.

In some embodiments of the present application, the foregoing performing edit processing on the input packet template may include, for example: creating at least one protocol descriptor in the input packet template, and further updating the protocol combination description field in the template descriptor in the input packet template, so that the updated protocol combination description field describes a protocol type sequence corresponding to protocol descriptors currently included in the input packet template. As shown in FIG. 4-*c*, the packet forwarding device creates one VLAN descriptor in the input packet template, and updates a protocol combination description field in the template descriptor in the input packet template, so that a protocol type sequence described by the protocol combination description field is corresponding to the protocol descriptors currently included in the input packet template. FIG. 4-*c* exemplarily shows that the protocol type sequence described by the protocol combination description field is updated from Ethernet+VLAN+IPv4 to Ethernet+VLAN+VLAN+IPv4.

In some embodiments of the present application, the foregoing performing edit processing on the input packet template may include, for example: deleting at least one protocol descriptor from the input packet template, and further updating the protocol combination description field in the template descriptor in the input packet template, so that the updated protocol combination description field describes a protocol type sequence corresponding to protocol descriptors currently included in the input packet template. As shown in FIG. 4-*d*, one VLAN descriptor and one Ethernet descriptor are deleted from the input packet template, and a protocol combination description field in the template descriptor in the input packet template is updated, so that a protocol type sequence described by the protocol combination description field is corresponding to the protocol descriptors currently included in the input packet template. FIG. 4-*d* exemplarily shows that the protocol type sequence described by the protocol combination description field is updated from Ethernet+VLAN+IPv4 to IPv4. FIG. 4-*d* further shows that one new Ethernet descriptor is added to the input packet template afterwards, and the protocol combination description field in the template descriptor in the input packet template is updated, so that a protocol type sequence described by the updated protocol combination description field is corresponding to the protocol descriptors currently included in the input packet template. The FIG. 4-*d* exemplarily shows that the protocol type sequence described by the protocol combination description field is updated from IPv4 to Ethernet+IPv4.

In some embodiments of the present application, the foregoing performing edit processing on the input packet template may include, for example: replacing at least one protocol descriptor in the input packet template. Because the at least one protocol descriptor is replaced, and a protocol type sequence corresponding to the input packet template may not change, it may be not required to update the protocol combination description field in the template descriptor in the input packet template. For example, as shown in FIG. 4-*e*, one VLAN descriptor is replaced in the input packet template, and because only one VLAN descriptor is replaced, the protocol type sequence (Ethernet+VLAN+IPv4) corresponding to the input packet template remains unchanged; therefore, it may be not required to update a protocol combination description field in the template descriptor in the input packet template.

It may be understood that replacing of one protocol descriptor in the input packet template may be broken down into that: one old protocol descriptor in the input packet template is first deleted and then one new protocol descriptor is created in the input packet template.

It may be understood that a protocol type sequence (for example, Ethernet+VLAN+IPv4) may not only describe a combination of protocol types corresponding to protocol descriptors included in an input packet template, but also describe a location relationship among protocol types, for example, the protocol type sequence Ethernet+VLAN+IPv4 may further describe that a location relationship among protocol types is that the VLAN is between the Ethernet and the IPv4.

308. Convert, based on the preset protocol field mapping relationship, M protocol descriptors included in the output packet template into M protocol header fields of an output packet.

309. Replace the N protocol header fields in the input packet with the M protocol header fields to obtain the output packet, where N and M are positive integers.

The foregoing N may be greater than, less than, or equal to the foregoing M.

For example, if a protocol descriptor is created in the foregoing input packet template in a process of performing edit processing on the input packet template, the foregoing M is greater than the foregoing N. If a protocol descriptor is deleted from the input packet template in the process of performing edit processing on the input packet template, the foregoing M is less than the foregoing N; if protocol descriptors are deleted from the input packet template and protocol descriptors are created in the input packet template in the process of performing edit processing on the input packet template, the foregoing M may be greater than, less than, or equal to the foregoing N.

It can be learned that, the packet forwarding device according to this embodiment first generates an input packet template based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor; and then, the packet forwarding device edits and processes the input packet template to obtain an output packet template, converts, based on the preset protocol field mapping relationship, M protocol descriptors included in the output packet template into M protocol header fields of an output packet, and replaces the N protocol header fields in the input packet with the M protocol header fields to obtain the output packet. During edit processing, edit processing is performed mainly on the input packet template instead of the entire input packet. Therefore, it helps reduce a data volume for edit processing, and further helps reduce instruction complexity for packet edit processing and improve efficiency of packet edit processing.

To help better implement the foregoing solutions in embodiments of the present application, in an embodiment of the present application, a relevant apparatus configured to implement the foregoing solutions is provided in the following.

Figure 5:
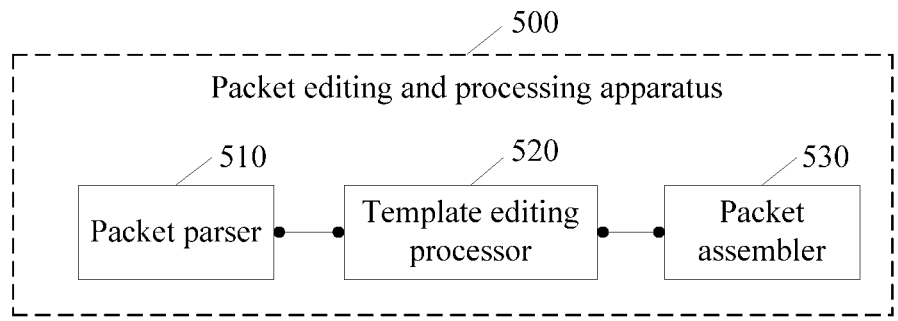
FIG. 5 is a schematic diagram of a packet edit processing apparatus according to an embodiment of the present application.

Referring to FIG. 5, an embodiment of the present application provides a packet edit processing apparatus 500, which may include a packet parser 510, a template editing processor 520, and a packet assembler 530.

The packet parser 510 is configured to generate an input packet template based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor.

The template editing processor 520 is configured to perform edit processing on the input packet template to obtain an output packet template.

The packet assembler 530 is configured to convert, based on the preset protocol field mapping relationship, M protocol descriptors included in the obtained output packet template into M protocol header fields of an output packet, and replace the N protocol header fields in the input packet with the M protocol header fields to obtain the output packet, where N and M are positive integers.

In some embodiments of the present application, the packet parser 510 may be specifically configured to: determine, according to packet receiving information of the input packet, a packet parsing table corresponding to the input packet, invoke a parsing instruction sequence in the packet parsing table to generate the input packet template based on the N to-be-edited protocol header fields of the input packet.

It may be understood that, a protocol header field has a one-to-one correspondence with a protocol descriptor; therefore, the packet parser 510 may obtain, based on the foregoing N to-be-edited protocol header fields of the input packet, the N protocol descriptors that are corresponding, in a one-to-one manner, to the N protocol header fields.

The foregoing N protocol header fields may include, for example: a VLAN tag, an Ethernet header field and/or an IPv4 header field, and the like, and correspondingly, the foregoing N protocol descriptors may include: a VLAN descriptor, an Ethernet descriptor and/or an IPv4 descriptor, and the like. A protocol descriptor corresponding to an Ethernet header field may be referred to as an Ethernet descriptor (that is, the Ethernet header field has a correspondence with the Ethernet descriptor). A protocol descriptor corresponding to a VLAN tag may also be referred to as a VLAN descriptor (that is, the VLAN tag has a correspondence with the VLAN descriptor). A protocol descriptor corresponding to an IPv4 header field may be referred to as an IPv4 descriptor (that is, the IPv4 header field has a correspondence with the IPv4 descriptor).

The foregoing preset protocol field mapping relationship is a mapping relationship between a protocol field included in a protocol descriptor and a protocol field included in a protocol header field that has a correspondence with the protocol descriptor; therefore, the protocol field mapping relationship may include, for example, a mapping relationship between protocol fields included in the VLAN tag and protocol fields included in the VLAN descriptor, a mapping relationship between protocol fields included in the IPv4 header field and protocol fields included in the IPv4 descriptor, or a mapping relationship between protocol fields included in the Ethernet header field and protocol fields included in the Ethernet descriptor. That is, the preset protocol field mapping relationship may indicate how to map protocol fields included in a protocol header field to protocol fields in a protocol descriptor that has a correspondence with the protocol header field; likewise, the preset protocol field mapping relationship may also indicate how to map protocol fields included in a protocol descriptor to protocol fields in a protocol header field that has a correspondence with the protocol descriptor. For example, the preset protocol field mapping relationship may indicate how to map protocol fields included in the IPv4 header field to protocol fields in the IPv4 descriptor, and may further indicate how to map protocol fields included in the IPv4 descriptor to protocol fields in the IPv4 header field; the preset protocol field mapping relationship may indicate how to map protocol fields included in the Ethernet header field to protocol fields in the Ethernet descriptor, and may further indicate how to map protocol fields included in the Ethernet descriptor to protocol fields in the Ethernet header field; the preset protocol field mapping relationship may indicate how to map protocol fields included in the VLAN tag to protocol fields in the VLAN descriptor, and may further indicate how to map protocol fields included in the VLAN descriptor to protocol fields in the VLAN tag, and so on.

Therefore, the packet parser 510 may generate, based on a particular protocol header field and the preset protocol field mapping relationship, a protocol descriptor that is in the input packet template and corresponding to the particular protocol header field; likewise, the packet parser 510 may also obtain, by means of conversion based on a particular protocol descriptor in the input packet template and the preset protocol field mapping relationship, a protocol header field corresponding to the particular protocol descriptor in the input packet template. For example, the VLAN descriptor in the input packet template may be generated based on the VLAN tag, and the preset protocol field mapping relationship; likewise, the VLAN tag may be obtained, by means of conversion, based on the preset protocol field mapping relationship and the VLAN descriptor in the input packet template. The IPv4 descriptor in the input packet template may be generated based on the IPv4 header field and the preset protocol field mapping relationship; and the IPv4 header field may also be obtained, by means of conversion, based on the preset protocol field mapping relationship and the IPv4 descriptor in the input packet template. The Ethernet descriptor in the input packet template may be generated based on the Ethernet header field and the preset protocol field mapping relationship; and the Ethernet header field may also be obtained, by means of conversion, based on the preset protocol field mapping relationship and the Ethernet descriptor in the input packet template. From this manner, other manners of conversion between a protocol header field and a protocol descriptor that have a correspondence may be deduced.

In some embodiments of the present application, a first protocol field included in a first protocol descriptor in the N protocol descriptors has a mapping relationship with at least one protocol field included in a first protocol header field in the N protocol header fields, and the first protocol descriptor has a correspondence with the first protocol header field.

In some embodiments of the present application, a second protocol field included in the first protocol header field in the N protocol header fields has a mapping relationship with at least one protocol field included in the first protocol descriptor in the N protocol descriptors, and the first protocol descriptor has a correspondence with the first protocol header field.

The foregoing first protocol header field or the foregoing second protocol header field may be any protocol header field or a specific protocol header field in the foregoing N protocol header fields. The foregoing first protocol header field or the foregoing second protocol header field may be, for example, the Ethernet header field, the IPv4 header field, the VLAN tag, or the like.

That is, a quantity of protocol fields included in a protocol header field may be equal or not equal to a quantity of protocol fields included in a protocol descriptor, where the protocol header field and the protocol descriptor have a correspondence with each other, for example, a quantity of protocol fields included in the IPv4 header field may be equal or not equal to a quantity of protocol fields included in the IPv4 descriptor, a quantity of protocol fields included in the Ethernet header field may be equal or not equal to a quantity of protocol fields included in the Ethernet descriptor, and a quantity of protocol fields included in the VLAN tag may be equal or not equal to a quantity of protocol fields included in the VLAN descriptor.

For example, if any protocol field included in the first protocol descriptor (for example, an IPv4 descriptor) separately has a mapping relationship with a plurality of protocol fields included in the first protocol header field (for example, an IPv4 header field), a quantity of protocol fields included in the first protocol descriptor is less than a quantity of protocol fields included in the first protocol header field. For another example, if any protocol field included in the first protocol header field (for example, an Ethernet header field) separately has a mapping relationship with a plurality of protocol fields included in the first protocol descriptor (for example, an Ethernet descriptor), a quantity of protocol fields included in the first protocol descriptor is greater than a quantity of protocol fields included in the first protocol header field. For another example, if each protocol field in some protocol fields included in the first protocol descriptor (for example, an IPv4 descriptor) has a mapping relationship with a plurality of protocol fields included in the first protocol header field (for example, an IPv4 header field) and each protocol field in some protocol fields included in the first protocol header field has a mapping relationship with a plurality of protocol fields included in the first protocol descriptor, a quantity of protocol fields included in the first protocol descriptor may be greater than, less than, or equal to a quantity of protocol fields included in the first protocol header field. For another example, if protocol fields included in the second protocol descriptor have a one-to-one mapping relationship with protocol fields included in the foregoing second protocol header field, a quantity of protocol fields included in the second protocol descriptor is equal to a quantity of protocol fields included in the second protocol header field. Other scenarios can be deduced from this.

To help better understand the field mapping relationship, the following describes, by using examples and with reference to FIG. 2-a to FIG. 2-g, several field mapping relationships that may exist between protocol fields included in a protocol descriptor and a protocol header field that have a correspondence with each other. A protocol descriptor A1 and a protocol header field B1 in FIG. 2-a to FIG. 2-g have a correspondence with each other.

Refer to FIG. 2-a to FIG. 2-g. FIG. 2-a exemplarily shows that protocol fields in the protocol descriptor A1 have a one-to-one mapping relationship with fields in the protocol header field B1. Specifically, a protocol field d11 in the protocol descriptor A1 has a mapping relationship with a protocol field d21 in the protocol header field B1 (that is, the protocol field d11 may be obtained, by means of conversion, based on the protocol field d21 in the protocol header field B1); a protocol field d12 in the protocol descriptor A1 has a mapping relationship with a protocol field d22 in the protocol header field B1 (that is, the protocol field d12 may be obtained, by means of conversion, based on the protocol field d22 in the protocol header field B1); a protocol field d13 in the protocol descriptor A1 has a mapping relationship with a protocol field d23 in the protocol header field B1 (that is, the protocol field d13 may be obtained, by means of conversion, based on the protocol field d23 in the protocol header field B1); a protocol field d14 in the protocol descriptor A1 has a mapping relationship with a protocol field d24 in the protocol header field B1 (that is, the protocol field d14 may be obtained, by means of conversion, based on the protocol field d24 in the protocol header field B1); and so on.

For another example, as shown in FIG. 2-b, FIG. 2-b exemplarily shows that between a protocol field in a protocol descriptor A1 may have a mapping relationship with a plurality of protocol fields in a protocol header field B1. Specifically, a protocol field d11 in the protocol descriptor A1 has a mapping relationship with protocol fields d21 and d22 in the protocol header field B1 (that is, the protocol field d11 may be obtained, by means of conversion, based on the protocol fields d21 and d22 in the protocol header field B1); likewise, a protocol field d12 in the protocol descriptor A1 has a mapping relationship with protocol fields d23, d24, and d25 in the protocol header field B1 (that is, the protocol field d12 may be obtained, by means of conversion, based on the protocol fields d23, d24, and d25 in the protocol header field B1); and so on.

For another example, as shown in FIG. 2-c, FIG. 2-c exemplarily shows that a protocol field in a protocol header field B1 may have a mapping relationship with a plurality of protocol fields in a protocol descriptor A1. Specifically, a protocol field d21 in the protocol header field B1 has a mapping relationship with protocol fields d11 and d12 in the protocol descriptor A1 (that is, the protocol fields d21 and d22 in the protocol descriptor A1 may be obtained, by means of conversion, based on the protocol field d21); likewise, a protocol field d22 in the protocol header field B1 has a mapping relationship with protocol fields d13, d14, and d15 in the protocol descriptor A1 (that is, the protocol fields d13, d14, and d15 in the protocol descriptor A1 may be obtained, by means of conversion, based on the protocol field d22); and so on.

For another example, as shown in FIG. 2-d, FIG. 2-d exemplarily shows that a protocol field in a protocol header field B1 has a mapping relationship with a plurality of protocol fields in a protocol descriptor A1, and another protocol field in the protocol descriptor A1 has a mapping relationship with a plurality of other protocol fields in the protocol header field B1. Specifically, FIG. 2-d exemplarily shows that a protocol field d11 in the protocol descriptor A1 has a mapping relationship with protocol fields d21 and d22 in the protocol header field B1 (that is, the protocol field d11 may be obtained, by means of conversion, based on the protocol fields d21 and d22 in the protocol header field B1); a protocol field d15 in the protocol descriptor A1 has a mapping relationship with protocol fields d24 and d25 in the protocol header field B1 (that is, the protocol field d15 may be obtained, by means of conversion, based on the protocol fields d24 and d25 in the protocol header field B1); a protocol field d23 in the protocol header field B1 has a mapping relationship with protocol fields d12, d13, and d13 in the protocol descriptor A1 (that is, the protocol fields d12, d13, and d13 in the protocol descriptor A1 may be obtained, by means of conversion, based on the protocol field d23 in the protocol header field B1); and so on.

For another example, as shown in FIG. 2-e, FIG. 2-e exemplarily shows that a protocol field in a protocol header field B1 has a mapping relationship with a plurality of protocol fields in a protocol descriptor A1, another protocol field in the protocol descriptor A1 has a mapping relationship with a plurality of other protocol fields in the protocol header field B1, and still another protocol field in the protocol descriptor A1 has a mapping relationship with still another protocol field in the protocol header field B1. Specifically, FIG. 2-e exemplarily shows that a protocol field d11 in the protocol descriptor A1 has a mapping relationship with protocol fields d21 and d22 in the protocol header field B1 (that is, the protocol field d11 may be obtained, by means of conversion, based on the protocol fields d21 and d22 in the protocol header field B1); a protocol field d23 in the protocol header field B1 has a mapping relationship with protocol fields d12 and d13 in the protocol descriptor A1 (that is, the protocol fields d12 and d13 may be obtained, by means of conversion, based on the protocol field d23 in the protocol header field B1); a protocol field d15 in the protocol descriptor A1 has a mapping relationship with a protocol field d25 in the protocol header field B1 (that is, the protocol field d15 may be obtained, by means of conversion, based on the protocol field d25 in the protocol header field B1); a protocol field d14 in the protocol descriptor A1 has a mapping relationship with a protocol field d24 in the protocol header field B1 (that is, the protocol field d14 may be obtained, by means of conversion, based on the protocol field d24 in the protocol header field B1); and so on.

For another example, as shown in FIG. 2-f, FIG. 2-f exemplarily shows that a protocol field in a protocol descriptor A1 has a mapping relationship with a plurality of protocol fields in a protocol header field B1, and still another protocol field in the protocol descriptor A1 has a mapping relationship with still another protocol field in the protocol header field B1. Specifically, FIG. 2-f exemplarily shows that a protocol field d11 in the protocol descriptor A1 has a mapping relationship with protocol fields d21, d22, and d23 in the protocol header field B1 (that is, the protocol field d11 may be obtained, by means of conversion, based on the protocol fields d21, d22, and d23 in the protocol header field B1); a protocol field d12 in the protocol descriptor A1 has a mapping relationship with a protocol field d24 in the protocol header field B1 (that is, the protocol field d12 may be obtained, by means of conversion, based on the protocol field d24 in the protocol header field B1); a protocol field d13 in the protocol descriptor A1 has a mapping relationship with a protocol field d25 in the protocol header field B1 (that is, the protocol field d13 may be obtained, by means of conversion, based on the protocol field d25 in the protocol header field B1); and so on.

For another example, as shown in FIG. 2-g, FIG. 2-g exemplarily shows that a protocol field in a protocol header field B1 has a mapping relationship with a plurality of protocol fields in a protocol descriptor A1, and still another protocol field in the protocol descriptor A1 has a mapping relationship with still another protocol field in the protocol header field B1. Specifically, FIG. 2-g exemplarily shows that a protocol field d21 in the protocol header field B1 has a mapping relationship with protocol fields d11, d12, and d13 in the protocol descriptor A1 (that is, the protocol fields d11, d12, and d13 in the protocol descriptor A1 may be obtained, by means of conversion, based on the protocol field d21 in the protocol header field B1); a protocol field d14 in the protocol descriptor A1 has a mapping relationship with a protocol field d22 in the protocol header field B1 (that is, the protocol field d14 may be obtained, by means of conversion, based on the protocol field d22 in the protocol header field B1); a protocol field d15 in the protocol descriptor A1 has a mapping relationship with a protocol field d23 in the protocol header field B1 (that is, the protocol field d15 may be obtained, by means of conversion, based on the protocol field d23 in the protocol header field B1); and so on.

It may be understood that, the several possible field mapping relationships that are described in FIG. 2-a to FIG. 2-g and between protocol fields included in a protocol descriptor and protocol fields included in a protocol header field are only used as examples. Certainly, protocol fields included in a protocol descriptor and protocol fields included in a protocol header field may also have other field mapping relationships, which are not exhaustively listed herein.

A protocol descriptor may be recorded in registers with a same width or different widths such as 1 bit, 8 bit, 16 bit, 32 bit, 64 bit, and 128 bit. After the input packet template is determined, storage locations of fields in the protocol descriptor may be fixed. If the storage locations of the fields in the protocol descriptor are relatively fixed, it helps further simplify complexity of an edit processing instruction because in this case, the edit processing instruction may be directly set according to an address regardless of specific content in the address.

In some embodiments of the present application, the foregoing input packet template further includes a template descriptor, where the template descriptor includes a protocol combination description field, and the protocol combination description field is used to describe a protocol type sequence corresponding to protocol descriptors included in the input packet template.

Likewise, the output packet template may also include a template descriptor, where the template descriptor may include a protocol combination description field, and the protocol combination description field is used to describe a protocol type sequence corresponding to protocol descriptors included in the output packet template. It may be understood that when a protocol descriptor included in the input packet template changes, the protocol combination description field may be adaptively updated, so that the protocol combination description field may describe a protocol type sequence corresponding to protocol descriptors currently included in the input packet template.

Optionally, the template descriptor in the input packet template may further include a header field length field that is used to record a total length of protocol header fields corresponding to the protocol descriptors included in the foregoing input packet template. It may be understood that when a protocol descriptor included in the input packet template changes, the header field length field in the template descriptor may be adaptively updated, so that the header field length field may describe a total length of protocol header fields corresponding to the protocol descriptors currently included in the input packet template. For example, it is assumed that the input packet template includes two protocol descriptors, and a total length of protocol header fields corresponding to the two protocol descriptors is 50 bytes (in this case, a value recorded in the header field length field is 50 bytes); and if one VLAN descriptor is created in the input packet template in a process of performing edit processing on the input packet template, where a length of a VLAN tag corresponding to the VLAN descriptor is 4 bytes, the value recorded in the header field length field may be updated to 54 bytes. For another example, it is assumed that the input packet template includes three protocol descriptors, and a total length of protocol header fields corresponding to the three protocol descriptors is 68 bytes (in this case, a value recorded in the header field length field is 68 bytes); and if one VLAN descriptor is deleted from the input packet template in a process of performing edit processing on the foregoing input packet template, where a length of a VLAN tag corresponding to the VLAN descriptor is 4 bytes, the value recorded in the header field length field may be updated to 64 bytes. Other cases can be deduced from this.

Optionally, the foregoing template descriptor may further include a forwarding indication field that is used to record a forwarding manner of the input packet. Optionally, the template descriptor may further include an accessory information field that is used to record additional information (receiving port number and/or receiving channel number of a packet) corresponding to the input packet. Certainly, the foregoing template descriptor may also include another field.

Optionally, in some embodiments of the present application, in the aspect of performing edit processing on the input packet template, the template editing processor 520 may be specifically configured to: determine an edit processing instruction sequence corresponding to the protocol type sequence, and invoke the determined edit processing instruction sequence to perform edit processing on the input packet template. Specifically, for each protocol type sequence, at least one edit processing instruction sequence may be preset; therefore, after the input packet template is generated, an edit processing instruction sequence corresponding to a protocol type sequence may be determined according to the protocol type sequence corresponding to protocol descriptors included in the input packet template, and the determined edit processing instruction sequence may be used to perform edit processing on the foregoing input packet template. It may be understood that if a corresponding edit processing instruction sequence is preset for a different protocol type sequence, it may be not required to temporarily generate an edit processing instruction sequence when edit processing is performed on the foregoing input packet template, which helps reduce instruction complexity and simplify computing complexity for edit processing.

Optionally, in some embodiments of the present application, in the aspect of performing edit processing on the input packet template, the template editing processor 520 may be specifically configured to: create at least one protocol descriptor in the input packet template, and update the protocol combination description field in the template descriptor in the input packet template, so that the updated protocol combination description field describes a protocol type sequence corresponding to protocol descriptors currently included in the input packet template.

Optionally, in some embodiments of the present application, in the aspect of performing edit processing on the input packet template, the template editing processor 520 may be specifically configured to: delete at least one protocol descriptor from the input packet template, and update the protocol combination description field in the template descriptor in the input packet template, so that the updated protocol combination description field describes a protocol type sequence corresponding to protocol descriptors currently included in the input packet template.

Optionally, in some embodiments of the present application, in the aspect of performing edit processing on the input packet template, the template editing processor 520 may be specifically configured to replace at least one protocol descriptor in the input packet template.

Optionally, in some embodiments of the present application, in the aspect of replacing the N protocol header fields in the input packet with the M protocol header fields to obtain the output packet, the packet assembler 530 may be specifically configured to: delete the N protocol header fields from the input packet; and insert the M protocol header fields into a position corresponding to the N protocol header fields deleted from the input packet.

It may be understood that replacing of one protocol descriptor in the input packet template may be broken down into that: one old protocol descriptor in the input packet template is first deleted and then one new protocol descriptor is created in the input packet template.

It may be understood that functions of each function module of the packet edit processing apparatus 500 in this embodiment may be specifically implemented according to the method in the foregoing method embodiment, and for a specific implementation process, reference may be made to the related description in the foregoing method embodiment, and details are not described herein again.

It can be learned that, the packet edit processing apparatus 500 according to this embodiment first generates an input packet template based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor; and then the packet edit processing apparatus 500 edits and processes the input packet template to obtain an output packet template, converts, based on the preset protocol field mapping relationship, M protocol descriptors included in the output packet template into M protocol header fields of an output packet, and replaces the N protocol header fields in the input packet with the M protocol header fields to obtain the output packet. During edit processing, edit processing is performed mainly on the input packet template instead of the entire input packet. Therefore, it helps reduce a data volume for edit processing, and further helps reduce instruction complexity for packet edit processing and improve efficiency of packet edit processing.

Figure 6:
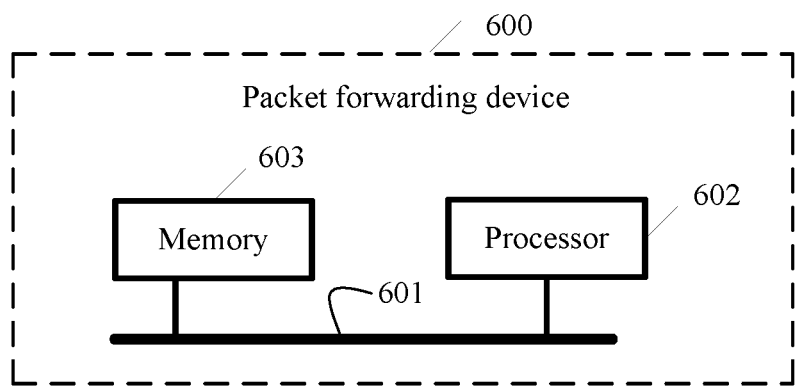
FIG. 6 is a schematic diagram of a packet forwarding device according to an embodiment of the present application.

Referring to FIG. 6, FIG. 6 is a schematic diagram of a packet forwarding device boo according to an embodiment of the present application. The packet forwarding device 600 may include at least one bus 601, at least one processor 602 that is connected to the bus 601, and at least one memory 603 that is connected to the bus 601.

The processor 602 invokes, by using the bus 601, code stored in the memory 603, so as to: generate an input packet template based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor; and perform edit processing on the input packet template to obtain an output packet template; and convert, based on the preset protocol field mapping relationship, M protocol descriptors included in the obtained output packet template into M protocol header fields of an output packet, and replace the N protocol header fields in the input packet with the M protocol header fields to obtain the output packet, where N and M are positive integers.

In some embodiments of the present application, in the aspect of generating an input packet template based on N to-be-edited protocol header fields of an input packet, and a preset protocol field mapping relationship, the processor 602 may be specifically configured to: determine, according to packet receiving information of the input packet, a packet parsing table corresponding to the input packet; invoke a parsing instruction sequence in the packet parsing table to generate the input packet template based on the N to-be-edited protocol header fields of the input packet.

It may be understood that, a protocol header field has a one-to-one correspondence with a protocol descriptor; therefore, the processor 602 may obtain, based on the N to-be-edited protocol header fields of the input packet, the N protocol descriptors that are corresponding, in a one-to-one manner, to the N protocol header fields.

The foregoing N protocol header fields may include, for example: a VLAN tag, an Ethernet header field and/or an IPv4 header field, and the like, and correspondingly, the foregoing N protocol descriptors may include: a VLAN descriptor, an Ethernet descriptor and/or an IPv4 descriptor, and the like. A protocol descriptor corresponding to an Ethernet header field may be referred to as an Ethernet descriptor (that is, the Ethernet header field has a correspondence with the Ethernet descriptor). A protocol descriptor corresponding to a VLAN tag may also be referred to as a VLAN descriptor (that is, the VLAN tag has a correspondence with the VLAN descriptor). A protocol descriptor corresponding to an IPv4 header field may be referred to as an IPv4 descriptor (that is, the IPv4 header field has a correspondence with the IPv4 descriptor).

The foregoing preset protocol field mapping relationship is a mapping relationship between a protocol field included in a protocol descriptor and a protocol field included in a protocol header field that has a correspondence with the protocol descriptor; therefore, the protocol field mapping relationship may include, for example, a mapping relationship between protocol fields included in the VLAN tag and protocol fields included in the VLAN descriptor, a mapping relationship between protocol fields included in the IPv4 header field and protocol fields included in the IPv4 descriptor, or a mapping relationship between protocol fields included in the Ethernet header field and protocol fields included in the Ethernet descriptor. That is, the preset protocol field mapping relationship may indicate how to map protocol fields included in a protocol header field to protocol fields in a protocol descriptor that has a correspondence with the protocol header field; likewise, the preset protocol field mapping relationship may also indicate how to map protocol fields included in a protocol descriptor to protocol fields in a protocol header field that has a correspondence with the protocol descriptor. For example, the preset protocol field mapping relationship may indicate how to map protocol fields included in the IPv4 header field to protocol fields in the IPv4 descriptor, and may further indicate how to map protocol fields included in the IPv4 descriptor to protocol fields in the IPv4 header field; the preset protocol field mapping relationship may indicate how to map protocol fields included in the Ethernet header field to protocol fields in the Ethernet descriptor, and may further indicate how to map protocol fields included in the Ethernet descriptor to protocol fields in the Ethernet header field; the preset protocol field mapping relationship may indicate how to map protocol fields included in the VLAN tag to protocol fields in the VLAN descriptor, and may further indicate how to map protocol fields included in the VLAN descriptor to protocol fields in the VLAN tag, and so on.

Therefore, the processor 602 may generate, based on a particular protocol header field and the preset protocol field mapping relationship, a protocol descriptor that is in the input packet template and corresponding to the particular protocol header field; likewise, the processor 602 may also obtain, by means of conversion based on a particular protocol descriptor in the input packet template and the preset protocol field mapping relationship, a protocol header field corresponding to the particular protocol descriptor in the input packet template. For example, the VLAN descriptor in the input packet template may be generated based on the VLAN tag, and the preset protocol field mapping relationship; likewise, the VLAN tag may be obtained, by means of conversion, based on the preset protocol field mapping relationship and the VLAN descriptor in the input packet template. The IPv4 descriptor in the input packet template may be generated based on the IPv4 header field and the preset protocol field mapping relationship; and the IPv4 header field may also be obtained, by means of conversion, based on the preset protocol field mapping relationship and the IPv4 descriptor in the input packet template. The Ethernet descriptor in the input packet template may be generated based on the Ethernet header field and the preset protocol field mapping relationship; and the Ethernet header field may also be obtained, by means of conversion, based on the preset protocol field mapping relationship and the Ethernet descriptor in the input packet template. From this manner, other manners of conversion between a protocol header field and a protocol descriptor that have a correspondence may be deduced.

If a protocol descriptor is recorded in registers with a same width or different widths such as 1 bit, 8 bit, 16 bit, 32 bit, 64 bit, and 128 bit, after the input packet template is determined, storage locations of fields in the protocol descriptor may be fixed. If the storage locations of the fields in the protocol descriptor are relatively fixed, it helps further simplify complexity of an edit processing instruction because in this case, the edit processing instruction may be directly set according to an address regardless of specific content in the address.

In some embodiments of the present application, a first protocol field included in a first protocol descriptor in the N protocol descriptors has a mapping relationship with at least one protocol field included in a first protocol header field in the N protocol header fields, and the first protocol descriptor has a correspondence with the first protocol header field.

In some embodiments of the present application, a second protocol field included in the first protocol header field in the N protocol header fields has a mapping relationship with at least one protocol field included in the first protocol descriptor in the N protocol descriptors, and the first protocol descriptor has a correspondence with the first protocol header field.

The foregoing first protocol header field or the foregoing second protocol header field may be any protocol header field or a specific protocol header field in the foregoing N protocol header fields. The foregoing first protocol header field or the foregoing second protocol header field may be, for example, the Ethernet header field, the IPv4 header field, the VLAN tag, or the like.

That is, a quantity of protocol fields included in a protocol header field may be equal or not equal to a quantity of protocol fields included in a protocol descriptor, where the protocol header field and the protocol descriptor have a correspondence with each other, for example, a quantity of protocol fields included in the IPv4 header field may be equal or not equal to a quantity of protocol fields included in the IPv4 descriptor, a quantity of protocol fields included in the Ethernet header field may be equal or not equal to a quantity of protocol fields included in the Ethernet descriptor, and a quantity of protocol fields included in the VLAN tag may be equal or not equal to a quantity of protocol fields included in the VLAN descriptor.

For example, if any protocol field included in the first protocol descriptor (for example, an IPv4 descriptor) separately has a mapping relationship with a plurality of protocol fields included in the first protocol header field (for example, an IPv4 header field), a quantity of protocol fields included in the first protocol descriptor is less than a quantity of protocol fields included in the first protocol header field. For another example, if any protocol field included in the first protocol header field (for example, an Ethernet header field) separately has a mapping relationship with a plurality of protocol fields included in the first protocol descriptor (for example, an Ethernet descriptor), a quantity of protocol fields included in the first protocol descriptor is greater than a quantity of protocol fields included in the first protocol header field. For another example, if each protocol field in some protocol fields included in the first protocol descriptor (for example, an IPv4 descriptor) has a mapping relationship with a plurality of protocol fields included in the first protocol header field (for example, an IPv4 header field) and each protocol field in some protocol fields included in the first protocol header field has a mapping relationship with a plurality of protocol fields included in the first protocol descriptor, a quantity of protocol fields included in the first protocol descriptor may be greater than, less than, or equal to a quantity of protocol fields included in the first protocol header field. For another example, if protocol fields included in the second protocol descriptor have a one-to-one mapping relationship with protocol fields included in the foregoing second protocol header field, a quantity of protocol fields included in the second protocol descriptor is equal to a quantity of protocol fields included in the second protocol header field. Other scenarios can be deduced from this.

To help better understand the field mapping relationship, the following describes, by using examples and with reference to FIG. 2-*a* to FIG. 2-*g*, several field mapping relationships that may exist between protocol fields included in a protocol descriptor and a protocol header field that have a correspondence with each other. A protocol descriptor A1 and a protocol header field B1 in FIG. 2-*a* to FIG. 2-*g* have a correspondence with each other.

Refer to FIG. 2-*a* to FIG. 2-*g*. FIG. 2-*a* exemplarily shows that protocol fields in the protocol descriptor A1 have a one-to-one mapping relationship with fields in the protocol header field B1. Specifically, a protocol field d11 in the protocol descriptor A1 has a mapping relationship with a protocol field d21 in the protocol header field B1 (that is, the protocol field d11 may be obtained, by means of conversion, based on the protocol field d21 in the protocol header field B1); a protocol field d12 in the protocol descriptor A1 has a mapping relationship with a protocol field d22 in the protocol header field B1 (that is, the protocol field d12 may be obtained, by means of conversion, based on the protocol field d22 in the protocol header field B1); a protocol field d13 in the protocol descriptor A1 has a mapping relationship with a protocol field d23 in the protocol header field B1 (that is, the protocol field d13 may be obtained, by means of conversion, based on the protocol field d23 in the protocol header field B1); a protocol field d14 in the protocol descriptor A1 has a mapping relationship with a protocol field d24 in the protocol header field B1 (that is, the protocol field d14 may be obtained, by means of conversion, based on the protocol field d24 in the protocol header field B1); and so on.

For another example, as shown in FIG. 2-*b*, FIG. 2-*b* exemplarily shows that between a protocol field in a protocol descriptor A1 may have a mapping relationship with a plurality of protocol fields in a protocol header field B1. Specifically, a protocol field d11 in the protocol descriptor A1 has a mapping relationship with protocol fields d21 and d22 in the protocol header field B1 (that is, the protocol field d11 may be obtained, by means of conversion, based on the protocol fields d21 and d22 in the protocol header field B1); likewise, a protocol field d12 in the protocol descriptor A1 has a mapping relationship with protocol fields d23, d24, and d25 in the protocol header field B1 (that is, the protocol field d12 may be obtained, by means of conversion, based on the protocol fields d23, d24, and d25 in the protocol header field B1); and so on.

For another example, as shown in FIG. 2-*c*, FIG. 2-*c* exemplarily shows that a protocol field in a protocol header field B1 may have a mapping relationship with a plurality of protocol fields in a protocol descriptor A1. Specifically, a protocol field d21 in the protocol header field B1 has a mapping relationship with protocol fields d11 and d12 in the protocol descriptor A1 (that is, the protocol fields d21 and d22 in the protocol descriptor A1 may be obtained, by means of conversion, based on the protocol field d21); likewise, a protocol field d22 in the protocol header field B1 has a mapping relationship with protocol fields d13, d14, and d15 in the protocol descriptor A1 (that is, the protocol fields d13, d14, and d15 in the protocol descriptor A1 may be obtained, by means of conversion, based on the protocol field d22); and so on.

For another example, as shown in FIG. 2-*d*, FIG. 2-*d* exemplarily shows that a protocol field in a protocol header field B1 has a mapping relationship with a plurality of protocol fields in a protocol descriptor A1, and another protocol field in the protocol descriptor A1 has a mapping relationship with a plurality of other protocol fields in the protocol header field B1. Specifically, FIG. 2-*d* exemplarily shows that a protocol field d11 in the protocol descriptor A1 has a mapping relationship with protocol fields d21 and d22 in the protocol header field B1 (that is, the protocol field d11 may be obtained, by means of conversion, based on the protocol fields d21 and d22 in the protocol header field B1); a protocol field d15 in the protocol descriptor A1 has a mapping relationship with protocol fields d24 and d25 in the protocol header field B1 (that is, the protocol field d15 may be obtained, by means of conversion, based on the protocol fields d24 and d25 in the protocol header field B1); a protocol field d23 in the protocol header field B1 has a mapping relationship with protocol fields d12, d13, and d13 in the protocol descriptor A1 (that is, the protocol fields d12, d13, and d13 in the protocol descriptor A1 may be obtained, by means of conversion, based on the protocol field d23 in the protocol header field B1); and so on.

For another example, as shown in FIG. 2-*e*, FIG. 2-*e* exemplarily shows that a protocol field in a protocol header field B1 has a mapping relationship with a plurality of protocol fields in a protocol descriptor A1, another protocol field in the protocol descriptor A1 has a mapping relationship with a plurality of other protocol fields in the protocol header field B1, and still another protocol field in the protocol descriptor A1 has a mapping relationship with still another protocol field in the protocol header field B1. Specifically, FIG. 2-*e* exemplarily shows that a protocol field d11 in the protocol descriptor A1 has a mapping relationship with protocol fields d21 and d22 in the protocol header field B1 (that is, the protocol field d11 may be obtained, by means of conversion, based on the protocol fields d21 and d22 in the protocol header field B1); a protocol field d23 in the protocol header field B1 has a mapping relationship with protocol fields d12 and d13 in the protocol descriptor A1 (that is, the protocol fields d12 and d13 may be obtained, by means of conversion, based on the protocol field d23 in the protocol header field B1); a protocol field d15 in the protocol descriptor A1 has a mapping relationship with a protocol field d25 in the protocol header field B1 (that is, the protocol field d15 may be obtained, by means of conversion, based on the protocol field d25 in the protocol header field B1); a protocol field d14 in the protocol descriptor A1 has a mapping relationship with a protocol field d24 in the protocol header field B1 (that is, the protocol field d14 may be obtained, by means of conversion, based on the protocol field d24 in the protocol header field B1); and so on.

For another example, as shown in FIG. 2-*f*, FIG. 2-*f* exemplarily shows that a protocol field in a protocol descriptor A1 has a mapping relationship with a plurality of protocol fields in a protocol header field B1, and still another protocol field in the protocol descriptor A1 has a mapping relationship with still another protocol field in the protocol header field B1. Specifically, FIG. 2-*f* exemplarily shows that a protocol field d11 in the protocol descriptor A1 has a mapping relationship with protocol fields d21, d22, and d23 in the protocol header field B1 (that is, the protocol field d11 may be obtained, by means of conversion, based on the protocol fields d21, d22, and d23 in the protocol header field B1); a protocol field d12 in the protocol descriptor A1 has a mapping relationship with a protocol field d24 in the protocol header field B1 (that is, the protocol field d12 may be obtained, by means of conversion, based on the protocol field d24 in the protocol header field B1); a protocol field d13 in the protocol descriptor A1 has a mapping relationship with a protocol field d25 in the protocol header field B1 (that is, the protocol field d13 may be obtained, by means of conversion, based on the protocol field d25 in the protocol header field B1); and so on.

For another example, as shown in FIG. 2-g, FIG. 2-g exemplarily shows that a protocol field in a protocol header field B1 has a mapping relationship with a plurality of protocol fields in a protocol descriptor A1, and still another protocol field in the protocol descriptor A1 has a mapping relationship with still another protocol field in the protocol header field B1. Specifically, FIG. 2-g exemplarily shows that a protocol field d21 in the protocol header field B1 has a mapping relationship with protocol fields d11, d12, and d13 in the protocol descriptor A1 (that is, the protocol fields d11, d12, and d13 in the protocol descriptor A1 may be obtained, by means of conversion, based on the protocol field d21 in the protocol header field B1); a protocol field d14 in the protocol descriptor A1 has a mapping relationship with a protocol field d22 in the protocol header field B1 (that is, the protocol field d14 may be obtained, by means of conversion, based on the protocol field d22 in the protocol header field B1); a protocol field d15 in the protocol descriptor A1 has a mapping relationship with a protocol field d23 in the protocol header field B1 (that is, the protocol field d15 may be obtained, by means of conversion, based on the protocol field d23 in the protocol header field B1); and so on.

It may be understood that, the several possible field mapping relationships that are described in FIG. 2-a to FIG. 2-g and between protocol fields included in a protocol descriptor and protocol fields included in a protocol header field are only used as examples. Certainly, protocol fields included in a protocol descriptor and protocol fields included in a protocol header field may also have other field mapping relationships, which are not exhaustively listed herein.

If a protocol descriptor is recorded in registers with a same width or different widths such as 1 bit, 8 bit, 16 bit, 32 bit, 64 bit, and 128 bit, after the input packet template is determined, storage locations of fields in the protocol descriptor may be fixed. If the storage locations of the fields in the protocol descriptor are relatively fixed, it helps further simplify complexity of an edit processing instruction because in this case, the edit processing instruction may be directly set according to an address regardless of specific content in the address.

In some embodiments of the present application, the foregoing input packet template further includes a template descriptor, where the template descriptor includes a protocol combination description field, and the protocol combination description field is used to describe a protocol type sequence corresponding to protocol descriptors included in the input packet template.

Likewise, the output packet template may also include a template descriptor, where the template descriptor may include a protocol combination description field, and the protocol combination description field is used to describe a protocol type sequence corresponding to protocol descriptors included in the output packet template. It may be understood that when a protocol descriptor included in the input packet template changes, the protocol combination description field may be adaptively updated, so that the protocol combination description field may describe a protocol type sequence corresponding to protocol descriptors currently included in the input packet template.

Optionally, the template descriptor in the input packet template may further include a header field length field that is used to record a total length of protocol header fields corresponding to the protocol descriptors included in the foregoing input packet template. It may be understood that when a protocol descriptor included in the input packet template changes, the header field length field in the template descriptor may be adaptively updated, so that the header field length field may describe a total length of protocol header fields corresponding to the protocol descriptors currently included in the input packet template. For example, it is assumed that the input packet template includes two protocol descriptors, and a total length of protocol header fields corresponding to the two protocol descriptors is 50 bytes (in this case, a value recorded in the header field length field is 50 bytes); and if one VLAN descriptor is created in the input packet template in a process of performing edit processing on the input packet template, where a length of a VLAN tag corresponding to the VLAN descriptor is 4 bytes, the value recorded in the header field length field may be updated to 54 bytes. For another example, it is assumed that the input packet template includes three protocol descriptors, and a total length of protocol header fields corresponding to the three protocol descriptors is 68 bytes (in this case, a value recorded in the header field length field is 68 bytes); and if one VLAN descriptor is deleted from the input packet template in a process of performing edit processing on the foregoing input packet template, where a length of a VLAN tag corresponding to the VLAN descriptor is 4 bytes, the value recorded in the header field length field may be updated to 64 bytes. Other cases can be deduced from this.

Optionally, the foregoing template descriptor may further include a forwarding indication field that is used to record a forwarding manner of the input packet. Optionally, the template descriptor may further include an accessory information field that is used to record additional information (receiving port number and/or receiving channel number of a packet) corresponding to the input packet. Certainly, the foregoing template descriptor may also include another field.

Optionally, in some embodiments of the present application, in the aspect of performing edit processing on the input packet template, the processor 602 may be specifically configured to: determine an edit processing instruction sequence corresponding to the protocol type sequence, and invoke the determined edit processing instruction sequence to perform edit processing on the input packet template. Specifically, for each protocol type sequence, at least one edit processing instruction sequence may be preset; therefore, after the input packet template is generated, an edit processing instruction sequence corresponding to a protocol type sequence may be determined according to the protocol type sequence corresponding to protocol descriptors included in the input packet template, and the determined edit processing instruction sequence may be used to perform edit processing on the foregoing input packet template. It may be understood that if a corresponding edit processing instruction sequence is preset for a different protocol type sequence, it may be not required to temporarily generate an edit processing instruction sequence when edit processing is performed on the foregoing input packet template, which helps reduce instruction complexity and simplify computing complexity for edit processing.

Optionally, in some embodiments of the present application, in the aspect of performing edit processing on the input packet template, the processor 602 may be specifically configured to: create at least one protocol descriptor in the input packet template, and update the protocol combination description field in the template descriptor in the input packet template, so that the updated protocol combination description field describes a protocol type sequence corresponding to protocol descriptors currently included in the input packet template.

Optionally, in some other embodiments of the present application, in the aspect of performing edit processing on the input packet template, the processor 602 may be specifically configured to: delete at least one protocol descriptor from the input packet template, and update the protocol combination description field in the template descriptor in the input packet template, so that the updated protocol combination description field describes a protocol type sequence corresponding to protocol descriptors currently included in the input packet template.

Optionally, in some other embodiments of the present application, in the aspect of performing edit processing on the input packet template, the processor 602 may be specifically configured to replace at least one protocol descriptor in the input packet template.

Optionally, in some other embodiments of the present application, in the aspect of replacing the N protocol header fields in the input packet with the M protocol header fields to obtain the output packet, the processor 602 may be specifically configured to: delete the N protocol header fields from the input packet; and insert the M protocol header fields into a position corresponding to the N protocol header fields deleted from the input packet.

It may be understood that replacing of one protocol descriptor in the input packet template may be broken down into that: one old protocol descriptor in the input packet template is first deleted and then one new protocol descriptor is created in the input packet template.

It may be understood that functions of each function module of the packet forwarding device 600 in this embodiment may be specifically implemented according to the method in the foregoing method embodiment, and for a specific implementation process, reference may be made to the related description in the foregoing method embodiment, and details are not described herein again.

It may be understood that the packet forwarding device 600 in this embodiment may be, for example, a router, a switch, a firewall, or another device.

It can be learned that, the packet forwarding device 600 according to this embodiment first generates an input packet template based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor; and then, the packet forwarding device 600 edits and processes the input packet template to obtain an output packet template, converts, based on the preset protocol field mapping relationship, M protocol descriptors included in the output packet template into M protocol header fields of an output packet, and replaces the foregoing N protocol header fields in the input packet with the M protocol header fields to obtain the output packet. During edit processing, edit processing is performed mainly on the input packet template instead of the entire input packet. Therefore, it helps reduce a data volume for edit processing, and further helps reduce instruction complexity for packet edit processing and improve efficiency of packet edit processing.

Figure 7:
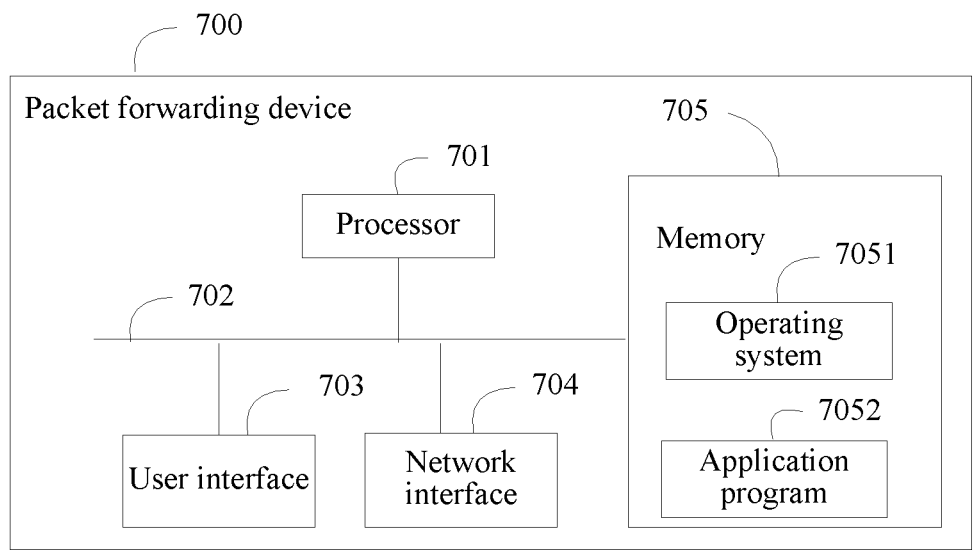
FIG. 7 is a schematic diagram of another packet forwarding device according to an embodiment of the present application.

Referring to FIG. 7, FIG. 7 is a structural block diagram of a packet forwarding device 700 provided in another embodiment of the present application.

The packet forwarding device 700 may include at least one processor 701, at least one network interface 704 or a user interface 703, a memory 705, and at least one communications bus 702. The communications bus 702 is configured to implement connection and communication between these components. The packet forwarding device 700 optionally includes the user interface 703, which includes: a screen (for example, a touchscreen, an LCD, a CRT, a holographic (Holographic) device, or a projector (Projector)), a click device (for example, a mouse, a trackball (trackball), a touchpad, or a touchscreen), a camera and/or a pickup apparatus, and the like.

The memory 702 may include, for example, a read-only memory and a random access memory, and provides an instruction and data for the processor 701.

A part of the memory 702 further includes a non-volatile random-access memory (NVRAM) and the like.

In some implementation manners, the memory 705 stores the following element, an executable module or a data structure, or a subset thereof, or an extension set thereof: an operating system 7051, including various system programs, and used to implement various basic services and process hardware-based tasks and an application program module 7052, including various application programs, and used to implement various application services.

In this embodiment of the present application, by invoking a program or an instruction stored in the memory 702, the processor 701 generates an input packet template based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor; edits and processes the input packet template to obtain an output packet template; converts, based on the preset protocol field mapping relationship, M protocol descriptors included in the obtained output packet template into M protocol header fields of an output packet; and replaces the N protocol header fields in the input packet with the M protocol header fields to obtain the output packet, where N and M are positive integers.

In some embodiments of the present application, in the aspect of generating an input packet template based on N to-be-edited protocol header fields of an input packet, and a preset protocol field mapping relationship, the processor 701 may be specifically configured to: determine, according to packet receiving information of the input packet, a packet parsing table corresponding to the input packet; invoke a parsing instruction sequence in the packet parsing table to generate the input packet template based on the N to-be-edited protocol header fields of the input packet.

It may be understood that, a protocol header field has a one-to-one correspondence with a protocol descriptor; therefore, the processor 701 may obtain, based on the N to-be-edited protocol header fields of the input packet, the N protocol descriptors that are corresponding, in a one-to-one manner, to the N protocol header fields.

The foregoing N protocol header fields may include, for example: a VLAN tag, an Ethernet header field and/or an IPv4 header field, and the like, and correspondingly, the foregoing N protocol descriptors may include: a VLAN descriptor, an Ethernet descriptor and/or an IPv4 descriptor, and the like. A protocol descriptor corresponding to an Ethernet header field may be referred to as an Ethernet descriptor (that is, the Ethernet header field has a correspondence with the Ethernet descriptor). A protocol descriptor corresponding to a VLAN tag may also be referred to as a VLAN descriptor (that is, the VLAN tag has a correspondence with the VLAN descriptor). A protocol descriptor corresponding to an IPv4 header field may be referred to as an IPv4 descriptor (that is, the IPv4 header field has a correspondence with the IPv4 descriptor).

The foregoing preset protocol field mapping relationship is a mapping relationship between a protocol field included in a protocol descriptor and a protocol field included in a protocol header field that has a correspondence with the protocol descriptor; therefore, the protocol field mapping relationship may include, for example, a mapping relationship between protocol fields included in the VLAN tag and protocol fields included in the VLAN descriptor, a mapping relationship between protocol fields included in the IPv4 header field and protocol fields included in the IPv4 descriptor, or a mapping relationship between protocol fields included in the Ethernet header field and protocol fields included in the Ethernet descriptor. That is, the preset protocol field mapping relationship may indicate how to map protocol fields included in a protocol header field to protocol fields in a protocol descriptor that has a correspondence with the protocol header field; likewise, the preset protocol field mapping relationship may also indicate how to map protocol fields included in a protocol descriptor to protocol fields in a protocol header field that has a correspondence with the protocol descriptor. For example, the preset protocol field mapping relationship may indicate how to map protocol fields included in the IPv4 header field to protocol fields in the IPv4 descriptor, and may further indicate how to map protocol fields included in the IPv4 descriptor to protocol fields in the IPv4 header field; the preset protocol field mapping relationship may indicate how to map protocol fields included in the Ethernet header field to protocol fields in the Ethernet descriptor, and may further indicate how to map protocol fields included in the Ethernet descriptor to protocol fields in the Ethernet header field; the preset protocol field mapping relationship may indicate how to map protocol fields included in the VLAN tag to protocol fields in the VLAN descriptor, and may further indicate how to map protocol fields included in the VLAN descriptor to protocol fields in the VLAN tag, and so on.

Therefore, the processor 701 may generate, based on a particular protocol header field and the preset protocol field mapping relationship, a protocol descriptor that is in the input packet template and corresponding to the particular protocol header field; likewise, the processor 701 may also obtain, by means of conversion based on a particular protocol descriptor in the input packet template and the preset protocol field mapping relationship, a protocol header field corresponding to the particular protocol descriptor in the input packet template. For example, the VLAN descriptor in the input packet template may be generated based on the VLAN tag, and the preset protocol field mapping relationship; likewise, the VLAN tag may be obtained, by means of conversion, based on the preset protocol field mapping relationship and the VLAN descriptor in the input packet template. The IPv4 descriptor in the input packet template may be generated based on the IPv4 header field and the preset protocol field mapping relationship; and the IPv4 header field may also be obtained, by means of conversion, based on the preset protocol field mapping relationship and the IPv4 descriptor in the input packet template. The Ethernet descriptor in the input packet template may be generated based on the Ethernet header field and the preset protocol field mapping relationship; and the Ethernet header field may also be obtained, by means of conversion, based on the preset protocol field mapping relationship and the Ethernet descriptor in the input packet template. From this manner, other manners of conversion between a protocol header field and a protocol descriptor that have a correspondence may be deduced.

In some embodiments of the present application, a first protocol field included in a first protocol descriptor in the N protocol descriptors has a mapping relationship with at least one protocol field included in a first protocol header field in the N protocol header fields, and the first protocol descriptor has a correspondence with the first protocol header field.

In some embodiments of the present application, a second protocol field included in the first protocol header field in the N protocol header fields has a mapping relationship with at least one protocol field included in the first protocol descriptor in the N protocol descriptors, and the first protocol descriptor has a correspondence with the first protocol header field.

The foregoing first protocol header field or the foregoing second protocol header field may be any protocol header field or a specific protocol header field in the foregoing N protocol header fields. The foregoing first protocol header field or the foregoing second protocol header field may be, for example, the Ethernet header field, the IPv4 header field, the VLAN tag, or the like.

That is, a quantity of protocol fields included in a protocol header field may be equal or not equal to a quantity of protocol fields included in a protocol descriptor, where the protocol header field and the protocol descriptor have a correspondence with each other, for example, a quantity of protocol fields included in the IPv4 header field may be equal or not equal to a quantity of protocol fields included in the IPv4 descriptor, a quantity of protocol fields included in the Ethernet header field may be equal or not equal to a quantity of protocol fields included in the Ethernet descriptor, and a quantity of protocol fields included in the VLAN tag may be equal or not equal to a quantity of protocol fields included in the VLAN descriptor.

For example, if any protocol field included in the first protocol descriptor (for example, an IPv4 descriptor) separately has a mapping relationship with a plurality of protocol fields included in the first protocol header field (for example, an IPv4 header field), a quantity of protocol fields included in the first protocol descriptor is less than a quantity of protocol fields included in the first protocol header field. For another example, if any protocol field included in the first protocol header field (for example, an Ethernet header field) separately has a mapping relationship with a plurality of protocol fields included in the first protocol descriptor (for example, an Ethernet descriptor), a quantity of protocol fields included in the first protocol descriptor is greater than a quantity of protocol fields included in the first protocol header field. For another example, if each protocol field in some protocol fields included in the first protocol descriptor (for example, an IPv4 descriptor) has a mapping relationship with a plurality of protocol fields included in the first protocol header field (for example, an IPv4 header field) and each protocol field in some protocol fields included in the first protocol header field has a mapping relationship with a plurality of protocol fields included in the first protocol descriptor, a quantity of protocol fields included in the first protocol descriptor may be greater than, less than, or equal to a quantity of protocol fields included in the first protocol header field. For another example, if protocol fields included in the second protocol descriptor have a one-to-one mapping relationship with protocol fields included in the foregoing second protocol header field, a quantity of protocol fields included in the second protocol descriptor is equal to a quantity of protocol fields included in the second protocol header field. Other scenarios can be deduced from this.

If a protocol descriptor is recorded in registers with a same width or different widths such as 1 bit, 8 bit, 16 bit, 32 bit, 64 bit, and 128 bit, after the input packet template is determined, storage locations of fields in the protocol descriptor may be fixed. If the storage locations of the fields in the protocol descriptor are relatively fixed, it helps further simplify complexity of an edit processing instruction because in this case, the edit processing instruction may be directly set according to an address regardless of specific content in the address.

In some embodiments of the present application, the foregoing input packet template further includes a template descriptor, where the template descriptor includes a protocol combination description field, and the protocol combination description field is used to describe a protocol type sequence corresponding to protocol descriptors included in the input packet template.

Likewise, the output packet template may also include a template descriptor, where the template descriptor may include a protocol combination description field, and the protocol combination description field is used to describe a protocol type sequence corresponding to protocol descriptors included in the output packet template. It may be understood that when a protocol descriptor included in the input packet template changes, the protocol combination description field may be adaptively updated, so that the protocol combination description field may describe a protocol type sequence corresponding to protocol descriptors currently included in the input packet template.

Optionally, the template descriptor in the input packet template may further include a header field length field that is used to record a total length of protocol header fields corresponding to the protocol descriptors included in the foregoing input packet template. It may be understood that when a protocol descriptor included in the input packet template changes, the header field length field in the template descriptor may be adaptively updated, so that the header field length field may describe a total length of protocol header fields corresponding to the protocol descriptors currently included in the input packet template. For example, it is assumed that the input packet template includes two protocol descriptors, and a total length of protocol header fields corresponding to the two protocol descriptors is 50 bytes (in this case, a value recorded in the header field length field is 50 bytes); and if one VLAN descriptor is created in the input packet template in a process of performing edit processing on the input packet template, where a length of a VLAN tag corresponding to the VLAN descriptor is 4 bytes, the value recorded in the header field length field may be updated to 54 bytes. For another example, it is assumed that the input packet template includes three protocol descriptors, and a total length of protocol header fields corresponding to the three protocol descriptors is 68 bytes (in this case, a value recorded in the header field length field is 68 bytes); and if one VLAN descriptor is deleted from the input packet template in a process of performing edit processing on the foregoing input packet template, where a length of a VLAN tag corresponding to the VLAN descriptor is 4 bytes, the value recorded in the header field length field may be updated to 64 bytes. Other cases can be deduced from this.

Optionally, the foregoing template descriptor may further include a forwarding indication field that is used to record a forwarding manner of the input packet. Optionally, the template descriptor may further include an accessory information field that is used to record additional information (receiving port number and/or receiving channel number of a packet) corresponding to the input packet. Certainly, the foregoing template descriptor may also include another field.

Optionally, in some embodiments of the present application, in the aspect of performing edit processing on the input packet template, the processor 701 may be specifically configured to: determine an edit processing instruction sequence corresponding to the protocol type sequence, and invoke the determined edit processing instruction sequence to perform edit processing on the input packet template. Specifically, for each protocol type sequence, at least one edit processing instruction sequence may be preset; therefore, after the input packet template is generated, an edit processing instruction sequence corresponding to a protocol type sequence may be determined according to the protocol type sequence corresponding to protocol descriptors included in the input packet template, and the determined edit processing instruction sequence may be used to perform edit processing on the foregoing input packet template. It may be understood that if a corresponding edit processing instruction sequence is preset for a different protocol type sequence, it may be not required to temporarily generate an edit processing instruction sequence when edit processing is performed on the foregoing input packet template, which helps reduce instruction complexity and simplify computing complexity for edit processing.

Optionally, in some embodiments of the present application, in the aspect of performing edit processing on the input packet template, the processor 701 may be specifically configured to: create at least one protocol descriptor in the input packet template, and update the protocol combination description field in the template descriptor in the input packet template, so that the updated protocol combination description field describes a protocol type sequence corresponding to protocol descriptors currently included in the input packet template.

Optionally, in some other embodiments of the present application, in the aspect of performing edit processing on the input packet template, the processor 701 may be specifically configured to: delete at least one protocol descriptor from the input packet template, and update the protocol combination description field in the template descriptor in the input packet template, so that the updated protocol combination description field describes a protocol type sequence corresponding to protocol descriptors currently included in the input packet template.

Optionally, in some other embodiments of the present application, in the aspect of performing edit processing on the input packet template, the processor 701 may be specifically configured to replace at least one protocol descriptor in the input packet template.

Optionally, in some other embodiments of the present application, in the aspect of replacing the N protocol header fields in the input packet with the M protocol header fields to obtain the output packet, the processor 701 may be specifically configured to: delete the N protocol header fields from the input packet; and insert the M protocol header fields into a position corresponding to the N protocol header fields deleted from the input packet.

It may be understood that replacing of one protocol descriptor in the input packet template may be broken down into that: one old protocol descriptor in the input packet template is first deleted and then one new protocol descriptor is created in the input packet template.

It may be understood that functions of each function module of the packet forwarding device 700 in this embodiment may be specifically implemented according to the method in the foregoing method embodiment, and for a specific implementation process, reference may be made to the related description in the foregoing method embodiment, and details are not described herein again.

It may be understood that the packet forwarding device 700 in this embodiment may be, for example, a router, a switch, a firewall, or another device.

It can be learned that, the packet forwarding device 700 according to this embodiment first generates an input packet template based on N to-be-edited protocol header fields of an input packet, and a preset protocol field mapping relationship, where the input packet template includes N protocol descriptors that are corresponding, in a one-to-one manner, to the N protocol header fields, and the protocol field mapping relationship is a mapping relationship between a protocol field included in a protocol descriptor and a protocol field included in a protocol header field that has a correspondence with the protocol descriptor; and then, the packet forwarding device 700 edits and processes the input packet template to obtain an output packet template, converts, based on the preset protocol field mapping relationship, M protocol descriptors included in the output packet template into M protocol header fields of an output packet, and replaces the foregoing N protocol header fields in the input packet with the M protocol header fields to obtain the output packet. During edit processing, edit processing is performed mainly on the input packet template instead of the entire input packet. Therefore, it helps reduce a data volume for edit processing, and further helps reduce instruction complexity for packet edit processing and improve efficiency of packet edit processing.

An embodiment of the present application provides a computer storage medium, where the computer storage medium stores a program, and the program performs a part or all of steps in any packet edit processing method provided in the foregoing embodiments of the present application.

In the foregoing embodiments, the description of each embodiment has respective focuses. For a part that is not described in detail in an embodiment, reference may be made to related descriptions in other embodiments.

It should be noted that, for ease of description, the foregoing method embodiments are described as a series of action combinations. However, a person skilled in the art should understand that the present application is not limited to the described sequence of the actions, because some steps may be performed in another sequence or performed at the same time according to the present application. In addition, a person skilled in the art should also understand that the embodiments described in this specification all belong to exemplary embodiments, and the involved actions and modules are not necessarily mandatory to the present application.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device, and may specifically be a processor in a computer device) to perform all or a part of the steps of the foregoing methods described in the embodiments of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method, comprising:
   obtaining a first protocol descriptor according to a protocol header field of an input packet, and further according to a preset protocol field mapping relationship, wherein the first protocol descriptor corresponds to the protocol header field of the input packet, and wherein the preset protocol field mapping relationship comprises a mapping relationship between the first protocol descriptor and the protocol field of the input packet;
   obtaining a second protocol descriptor according to the first protocol descriptor;
   obtaining, according to the preset protocol field mapping relationship and the second protocol descriptor, a second protocol header field; and
   obtaining an output packet, wherein the output packet comprises the second protocol header field.

2. The method according to claim 1, where the obtaining the first protocol descriptor comprises:
- determining, according to packet receiving information of the input packet, a packet parsing table corresponding to the input packet; and
- invoking a parsing instruction sequence in the packet parsing table to generate the first protocol descriptor according to the protocol header field of the input packet.

3. The method according to claim 1, where the first protocol descriptor comprises a plurality of protocol fields corresponding to a protocol field of the protocol header field of the input packet.

4. The method according to claim 1, where the first protocol descriptor comprises a second protocol field corresponding to a protocol field of the protocol header field of the input packet.

5. The method according to claim 1, where the first protocol descriptor comprises a third protocol field corresponding to a plurality of protocol fields of the protocol header field of the input packet.

6. The method according to claim 1, further comprising:
- obtaining a template descriptor, where the template descriptor comprises a protocol combination description field, and wherein the protocol combination description field describes a protocol type sequence corresponding to the first protocol descriptor.

7. A non-transitory computer-readable medium having processor-executable instructions stored thereon, wherein the processor-executable instructions, when executed by a processor, cause the processor to:
- obtain a first protocol descriptor according to a protocol header field of an input packet, and further according to a preset protocol field mapping relationship, wherein the first protocol descriptor corresponds to the protocol header field of the input packet, and wherein the preset protocol field mapping relationship comprises a mapping relationship between the first protocol descriptor and the protocol field of the input packet;
- obtain a second protocol descriptor according to the first protocol descriptor; and
- obtain, according to the preset protocol field mapping relationship and the second protocol descriptor, a second protocol header field, and
- obtain an output packet, where the output packet comprises the second protocol header field.

8. The non-transitory computer-readable medium according to claim 7, wherein the instructions cause the processor to:
- determine, according to packet receiving information of the input packet, a packet parsing table corresponding to the input packet; and
- invoke a parsing instruction sequence in the packet parsing table to obtain the first protocol descriptor according to the protocol header field of the input packet.

9. The non-transitory computer-readable medium according to claim 7, wherein the first protocol descriptor comprises a plurality of protocol fields corresponding to a protocol field of the protocol header field of the input packet.

10. The non-transitory computer-readable medium according to claim 7, where the first protocol descriptor comprises a second protocol field corresponding to a protocol field of the protocol header field of the input packet.

11. The non-transitory computer-readable medium according to claim 7, where the first protocol descriptor comprises a third protocol field corresponding to a plurality of protocol fields of the protocol header field of the input packet.

12. The non-transitory computer-readable medium according to claim 7, wherein the instructions further cause the processor to obtain a template descriptor, wherein the template descriptor comprises a protocol combination description field, and wherein the protocol combination description field describes a protocol type sequence corresponding to the first protocol descriptor.

13. The non-transitory computer-readable medium according to claim 12, wherein the instructions that cause the processor to obtain the first protocol descriptor cause the processor to:
- determine an edit processing instruction sequence corresponding to the protocol type sequence; and
- invoke the edit processing instruction sequence to obtain the second protocol descriptor according to the first protocol descriptor.

14. The non-transitory computer-readable medium according to claim 12, wherein the instructions that cause the processor to obtain the first protocol descriptor cause the processor to:
- create a third protocol descriptor; and
- update the protocol combination description field in the template descriptor so that the updated protocol combination description field describes a protocol type sequence corresponding to the first protocol descriptor and the third protocol descriptor, wherein the third protocol descriptor is different from the first protocol descriptor.

15. The non-transitory computer-readable medium according to claim 12, wherein the instructions that cause the processor to obtain the first protocol descriptor cause the processor to:
- delete the first protocol descriptor; and
- update the protocol combination description field in the template descriptor so that the updated protocol combination description field describes a protocol type sequence corresponding to a fourth protocol descriptor, where the fourth protocol descriptor is different from the first protocol descriptor.

16. The non-transitory computer-readable medium according to claim 12, where the instructions that cause the processor to obtain the first protocol descriptor further cause the processor to replace the first protocol descriptor with a fifth protocol descriptor, wherein the fifth protocol descriptor is different from the first protocol descriptor.

17. A packet forwarding device, comprising:
- a processor; and
- a non-transitory computer-readable storage medium storing a program to be executed by the processor, the program including instructions to:
  - obtain a first protocol descriptor according to a protocol header field of an input packet, and further according to a preset protocol field mapping relationship, where the first protocol descriptor corresponds to the protocol header field of the input packet, and wherein the preset protocol field mapping relationship comprises a mapping relationship between the first protocol descriptor and the protocol field of the input packet;
  - obtain a second protocol descriptor according to the first protocol descriptor;
  - obtain, according to the preset protocol field mapping relationship and the second protocol descriptor, a second protocol header field; and obtain an output packet, where the output packet comprises the second protocol header field.

18. The packet forwarding device according to claim 17, wherein, in an aspect of obtaining the first protocol descriptor, the processor is configured to:
    determine, according to packet receiving information of the input packet, a packet parsing table corresponding to the input packet; and
    invoke a parsing instruction sequence in the packet parsing table to obtain the first protocol descriptor according to the protocol header field of the input packet.

19. The packet forwarding device according to claim 17, wherein the first protocol descriptor comprises a plurality of protocol fields corresponding to a protocol field of the protocol header field of the input packet.

20. The packet forwarding device according to claim 17, wherein the first protocol descriptor comprises a second protocol field corresponding to a protocol field of the protocol header field of the input packet.

21. The packet forwarding device according to claim 17, wherein the first protocol descriptor comprises a third protocol field corresponding to a plurality of protocol fields of the protocol header field of the input packet.

22. The packet forwarding device according to claim 17, wherein the program further includes instructions to obtain a template descriptor, wherein the template descriptor comprises a protocol combination description field, and wherein the protocol combination description field describes a protocol type sequence corresponding to the first protocol descriptor.

23. The packet forwarding device according to claim 22, wherein the instructions to obtain the first protocol descriptor include instructions to:
    determine an edit processing instruction sequence corresponding to the protocol type sequence; and
    invoke the determined edit processing instruction sequence to the first protocol descriptor.

24. The packet forwarding device according to claim 22, where the template descriptor further comprises a forwarding indication field that is used to record a forwarding manner of the input packet.

25. The packet forwarding device according to claim 24, where the template descriptor further comprises an accessory information field that is used to record additional information corresponding to the input packet, and wherein the additional information comprises one or more of a receiving port number of the input packet, or a receiving channel number of the input packet.

26. The packet forwarding device according to claim 17, where the packet forwarding device comprises at least one of a router, a switch or a firewall.

* * * * *